United States Patent
Spuehler et al.

(10) Patent No.: US 6,778,565 B2
(45) Date of Patent: Aug. 17, 2004

(54) PULSE-GENERATING LASER

(75) Inventors: Gabriel J. Spuehler, Zürich (CH);
Lukas Krainer, Zürich (CH); Kurt Weingarten, Zürich (CH); Rudiger Paschotta, Zürich (CH); Ursula Keller, Zürich (CH)

(73) Assignee: Gigatera AG, Dietikon (CH)

( * ) Notice: Subject to any disclaimer, the term of this patent is extended or adjusted under 35 U.S.C. 154(b) by 0 days.

(21) Appl. No.: 10/288,114

(22) Filed: Nov. 5, 2002

(65) Prior Publication Data

US 2003/0118060 A1 Jun. 26, 2003

Related U.S. Application Data

(63) Continuation-in-part of application No. 09/962,261, filed on Sep. 24, 2001.
(60) Provisional application No. 60/366,279, filed on Mar. 15, 2002.

(51) Int. Cl.$^7$ .................................................. H01S 3/10
(52) U.S. Cl. ......................... 372/25; 372/18; 372/11; 372/20; 372/6
(58) Field of Search ............................ 372/18, 20, 25, 372/11, 6, 26

(56) References Cited

U.S. PATENT DOCUMENTS

| | | | |
|---|---|---|---|
| 4,025,875 A | 5/1977 | Fletcher et al. | |
| 4,314,211 A | 2/1982 | Mollenauer | |
| 4,435,809 A | * 3/1984 | Tsang et al. | 372/49 |
| 4,930,131 A | 5/1990 | Sizer, II | |
| 5,007,059 A | 4/1991 | Keller et al. | |
| 5,163,059 A | 11/1992 | Negus et al. | |
| 5,274,659 A | 12/1993 | Harvey et al. | |
| 5,590,142 A | 12/1996 | Shan | |
| 5,701,327 A | 12/1997 | Cunningham et al. | |
| 5,926,492 A | 7/1999 | Yoshida et al. | |
| 6,034,975 A | * 3/2000 | Harter et al. | 372/18 |
| 6,072,811 A | 6/2000 | Fermann et al. | |
| 6,097,741 A | 8/2000 | Lin et al. | |
| 6,108,465 A | 8/2000 | Iida et al. | |
| 6,256,434 B1 | * 7/2001 | Matuschek et al. | 385/37 |
| 6,393,035 B1 | * 5/2002 | Weingarten et al. | 372/18 |
| 6,430,349 B1 | * 8/2002 | Hayden et al. | 385/132 |
| 6,538,295 B1 | * 3/2003 | Bronner et al. | 257/412 |
| 6,560,267 B1 | * 5/2003 | Tomaru et al. | 372/98 |
| 2001/0021215 A1 | * 9/2001 | Bunting et al. | 372/70 |
| 2003/0058904 A1 | * 3/2003 | Krainer et al. | 372/25 |
| 2003/0118060 A1 | * 6/2003 | Spuehler et al. | 372/18 |

OTHER PUBLICATIONS

"Passively modelocked diode–pumped erbium–yiierbium glass laser using a semiconductor saturable mirror"/ Spuehler et al; Electronics Letters,vol. 35 No. 7,Apr. 1, 1999pp567–569.*

(List continued on next page.)

*Primary Examiner*—Leon Scott, Jr.
(74) *Attorney, Agent, or Firm*—Rankin, Hill, Porter & Clark LLP

(57) ABSTRACT

An optically pumped laser with an Er:Yb: doped solid state gain element is disclosed, which is passively mode-locked by means of a saturable absorber mirror. The laser is designed to operate at a fundamental repetition rate exceeding 1 GHz and preferably at an effective wavelength between 1525 nm and 1570 nm. Compared to state of the art solid state pulsed lasers, the threshold for Q-switched-mode-locked operation is substantially improved. Thus, according to one embodiment, the laser achieves a repetition rate beyond 40 GHz. The laser preferably comprises means for wavelength tuning and repetition rate locking.

46 Claims, 14 Drawing Sheets

OTHER PUBLICATIONS

WO 00/45480, High-Repetition Rate Passively Mode-Locked Solid-State Laser, Publication Date: Aug. 3, 2000.

WO 01/47075 A1, Mode-Couplec Laser, Publication Date: Jun. 28, 2001.

WO 01/35537 A2, "Adaptive Beam-Time Coding Method and Apparatus", Publication Date: May 17, 2001.

Patent Abstracts of Japan, "Solid State Laser Device Excited by Laser Diode, and Optical Printer", Publication No. 01-276782, Publication Date: Jul. 11, 1989.

Krainer L et al: "Passively Mode-Locked ND: YV04 Laser With Up to 13 GHZ Repetition Rate", Applied Physics B: Lasers and Optics, Springer International, Berlin, DE, Sep. 3, 1999, XP000885010.

Spuhler G J et al: "Passively mode locked diode-pumped erbium-ytterbium glass laser using a semiconductor saturable absorber mirror", Electronics Letters, IEE Stevenage, GB, vol. 35, No. 7, Apr. 1999.

Thoen E R et al: "Erbium-Ytterbium Waveguide Laser Mode-Locked With a Semiconductor Saturable Absorber Mirror", IEEE Photonics Technology Letters, IEEE Inc. New York, US, vol. 12, No. 2, Feb. 2000.

WO 00/45197, "Improved Ion Exchange Technology for Fabrication of Waveguide Source Lasers", Publication Date Aug. 3, 2000.

Self Mode-Locking of Lasers with Saturable Absorbers, Applied Physics Letters, Vol. 8, No. 7, A.J. DeMaria et al., Received Jan. 25, 1966, pp. 174–176.

Passively modelocked diode-pumped erbium-ytterbium glass laser using semiconductor saturable absorber mirror, Electronics Letters, Apr. $1^{st}$, 1999, vol. 35 No. 7.

Stabilization of an active harmonically mode-locked fiber laser using two-photon absorption, E.R. Thoen et al., Department of Electrnical Engineering and Computer Science, Received Mar. 6, 2000.

Suppression of Q-switch instabilities by feedback control in passively mode-locked lasers, Nicolas Joly and Serge Bielawski, Laboratoire de Physique des Lasers, Received Oct. 2, 2000.

Suppression of Q-switched mode locking and break-up into multiple pulses by inverse saturable absorption, T.R. Schibli et al., High-Frequence and Quantum Electronics Laboratory, Karlsruhe University, Received Oct. 13, 1999.

control of Q-switched mode locking by active feedback, T.R. Schibli et al., High-Frequency and Quantum Electronics Laboratory, University of Karlsruhe, Received Aug. 30, 2000.

Erbium-Ytterbium Waveguide Laser Mode-Locked with a Semiconductor Saturable Absorber Mirror, E.R. Thoen et al., IEEE Photonics Technology Letters, vol. 12, No. 2, Feb. 2000, pp. 149–151.

XP-002162139, 77 GHz soliton modelocked Nd:YVO4 laser, L. Krainer et al., Electronics Letters, Oct. 26th, 2000, vol. 36 No. 22, pp. 1846–1848.

XP 000689812, Semiconductor Saturable Absorber Mirrors (SESAM's) for Femtosecond to Nanosecond Pulse Generation in Solid-State Lasers, Ursula Keller et al., Quantum Electronics, vol. 2 No. 3, Sep. 1996, pp. 435–451.

High Speed Photonics Sampling and Switching, Thomas R. Clark, Sowilo Networks, Inc., Monday Afternoon/Cleo 2001, pp. 87–88.

Bulk Er:Yb:glass soliton femtosecond laser, G. Wasik et al., Monday Morning/Cleo 2001, pp. 3–4.

2.5 GHz and 5 GHz Harmonic Mode-Locking of a Diode-Pumped Bulk Erbium-Ytterbium Glass Laser at 1.5 Microns, P. Laporta et al., IEEE Photonics Technology Letters, vol. 7 No. 2 Feb. 1995, pp. 155–157.

NaCl:OH color center laser modelocked by a novel bonded saturable Bragg reflector, E.J. Mozdy et al., School of Electrical Engineering, Cornell University, Received Dec. 29, 1997, pp. 62–64.

Diode-pumped microchip Er-Yb:glass laser, P. Laporta et al, Optics Letters/vol. 18, No. 15, Aug. 1, 1993, pp. 1232–1234.

Self-starting mode-locked Cr4+:YAG laser with a low-loss broadband semiconductor saturable-absorber mirror, Zhigang Zhang et al., Optics Letters/vol. 24 No. 23/Dec. 1, 1999, pp. 1768–1770.

True fundamental solitons in a passively mode-locked short-cavity Cr4+:YAG laser, B.C. Collings et al., Optics Letters/vol. 22, No. 14/Jul. 15, 1997, pp. 1098–1100.

Q-switching stability limits of continuous-wave passive mode locking, C. Honninger et al., J. Opt. Soc. Am. B/vol. 16, No. 1/Jan. 1999, pp. 46–56.

Compact Kerr-lens mode-locked resonators, B.E. Bouma et al., Optics Letters/vol. 21, No. 2/Jan. 15, 1996, pp. 134–136.

Laser oscillation of Er3+:YVO4 and Er3+, Yb3+:YVO4 crystals in the spectral range around 1.6um, I. Sokolska et al., Appl. Phys. B (2000)/Digital Object Identifier, Received Aug. 24, 2000.

Ultrafast All-Solid-State Laser Technology, U. Keller, Appl. Phys. B 58, 347–363 (1994), Received Feb. 22, 1994.

Diode-Pumped, High Repetition Rate, Resonat Passive Mode-Locked Nd:YLF Laser, U. Keller et al., OSA Proceedings on Advanced Solid-State Laser, 1992, vol. 13, pp. 94–97.

* cited by examiner

PULSE-GENERATING LASER

FIELD OF THE INVENTION

This invention relates to lasers, and more particularly to passively mode-locked solid-state lasers designed to operate at high repetition rates exceeding 1 GHz.

BACKGROUND OF THE INVENTION

Pulsed lasers are becoming highly important for telecom applications. As data transmission rates continue to increase, the base data transmission rate for high-end systems is moving from 10 GHz (e.g. defined by the SONET/SDH OC-192 standard among others) to approximately 40 GHz (e.g. defined by OC-768 standard among others). These higher data rates become increasing difficult due to affects of chromatic and polarization mode dispersion. State of the art systems use non-return-to-zero (NRZ) modulation format, and this format is more susceptible to degradations due to these affects than a return-to-zero (RZ) format. In addition, an RZ format allows the use of optical pulses, and ultimately the use of related soliton affects, including soliton dispersion management techniques.

Today's pulse sources for Return-to-Zero (RZ)-coding transmission are complex, require a high power radio-frequency (RF) driver and have limited power output and scalability of the approach. The widely used approach of a system of a high power continuous-wave distributed feedback (DFB) laser and a subsequent set of modulators to turn the cw output into a pulse train relies on high bandwidth high contrast ratio modulators, which are hard to get with high bandwidths (maximum working frequencies), for example with bandwidths as high as above 40 gigahertz (GHz). Alternatives are active harmonically mode-locked fiber lasers or actively mode-locked semiconductor lasers. In order to scale the repetition rate of active harmonically mode-locked fiber lasers one has to increase the harmonic, at which these lasers are operated, which has strong impacts on the jitter and on pulse-to-pulse variations. The repetition rate of mode-locked semiconductor lasers can be scaled up to several hundred GHz, but they have a fundamental power limitation due to the limited mode area in these lasers. That is why already in the 10 GHz regime, erbium-doped fiber amplifiers (EDFAs) are required for this approach to get high enough average power levels.

Also, due to the limited transmission fiber power handling capacities, as the data rate goes up, for a given average power coming from the optical source, the energy per bit goes down. This decreases the signal-to-noise ratio at the receiver end of the system, if all other parameters are assumed to be constant. Therefore, it is desirable to have increased average power at higher repetition rates to compensate for this and maintain appropriate signal-to-noise levels. The average power achievable is ultimately limited by nonlinear effects in the fiber (stimulated Brillouin scattering (SBS), self-phase modulation (SPM), related phenomena such as four-wave mixing etc.). Further, the achievable average power is also limited by maximum thermal power handling capabilities of the fiber. With a pulsed format, the amount of SPM increases due to the increased intensity at the peak of the pulse. At the same time, the threshold for SBS is increased, i.e. improved due to the increased bandwidth of the signal, which in turn are due to the shorter temporal pulses. Recently, solutions such as soliton-based and dispersion-managed soliton systems have been proposed, which require clean Gaussian or hyperbolic-secant-squared pulse shapes, to further improve transmission at high repetition rates through fiber systems.

This invention relates to the field of pulsed lasers with high repetition frequencies. Passive modelocking of solid-state lasers has been demonstrated to frequencies as high as 77 GHz (see Krainer, et. al., "77 GHz soliton modelocked NdYVO$_4$ laser", Electronics Letters, vol. 36, no. 22). Passive modelocking is limited by the onset of Q-switched modelocking (QML) as e.g. described in WO 00/45480 and various scientific publications. According to the sate of the art, Nd:Vanadate is the material of choice for passively mode-locked solid-state lasers due to its excellent crystal quality, strong pump absorption, and high laser cross section which helps avoid the onset of QML.

Modelocking is a special operation regime of lasers where an intracavity modulation (amplitude or phase modulator) forces all of the laser modes to operate at a constant phase, i.e., phase-locked or "mode-locked", so that the temporal shape of the laser output forms a continuously repeating train of short (typically in the range of picoseconds or femtoseconds) optical pulses. The repetition rate of this pulse train is set by the inverse of the laser round-trip time, or equivalently by the free spectral range of the laser, $f_{rep}=c/2L$ where c is the speed of light and L is the cavity length for a standing wave cavity. This repetition rate $f_{rep}$ is termed the fundamental repetition rate of the laser cavity, since this corresponds to only one laser pulse circulating in the cavity per round trip. The repetition rate can be scaled by integer multiples N of the fundamental repetition rate under certain conditions, and this is called harmonic modelocking. In this case, there are multiple laser pulses circulating in the cavity per round trip, which can increase the timing and amplitude jitter and which can differ from each other in the time and frequency domain (pulse-to-pulse variations. The large variety of different harmonic pulses can have different temporal and spectral shapes).

Among the available modelocking techniques, active modelockers have the disadvantages of cost and complexity. A typical device requires a precision electro-optical component, plus drive electronics which typically consists of a high-power, high-stability RF-signal (for acousto-optic modulators) or high-voltage (for electro-optic modulator) components. Additionally, feedback electronics may be required to stabilize either the drive signal for the modulator and/or the laser cavity length to achieve the necessary stability from the system (cf. U.S. Pat. No 4,025,875, Fletcher et al., "Length controlled stabilized mode-lock Nd:YAG laser" or U.S. Pat. No. 4,314,211, Mollenauer, "Servo-controlled optical length of mode-locked lasers")

This is one reason why passive modelocking is often the technique of choice for short pulses and high repetition rates. Compared to active modelocking, passive modelocking at the fundamental repetition rate, is a much simpler, robust, and lower-cost approach to generating mode-locked pulses. Passive modelocking relies on a saturable absorber mechanism, which produces either decreasing loss with increasing optical intensity, or similarly an increase gain with increasing optical intensity. When the saturable absorber parameters are correctly adjusted for the laser system, the optical intensity in the laser cavity is enhanced such that a mode-locked pulse train builds up over a time-period corresponding to a given number of round-trips in the laser cavity.

Passive modelocking is also well-established in the state of the art (see A. J. DeMaria et al., "Self mode-locking of lasers with saturable absorbers", Applied Physics Letters, vol. 8, pp, 174–176, 1966). The most significant developments in passive modelocking in the recent years have been Kerr-Lens Modelocking (KLM) (U.S. Pat. No. 5,163,059, Negus et al., "Mode-locked laser using non-linear self-focusing element") for generation of femtosecond pulses from Ti:sapphire and other femtosecond laser systems, and the saturable absorber mirror device for generating picosecond and femtosecond pulses in a wide number of solid-state lasers (see U. Keller et al., "Semiconductor saturable absorber mirrors for femtosecond to nanosecond pulse generation in solid-state lasers," Journal of Selected Topics in Quantum Electronics (JSTQE), vol. 2, no. 3, pp. 435–453, 1996).

Absorber structures suited for operation at wavelengths associated with current telecommunication applications, e.g. 1550 nm, have been demonstrated, e.g. in U.S. Pat. No. 5,701,327. Mozdy, et. al., "NaCL:OH— color center laser modelocked by a novel bonded saturable Bragg reflector" Optics Communications 151 (1998) 62–64, Zhang, et. al., "Self-starting mode-locked $Cr^{4+}$:YAG laser with a low-loss broadband semiconductor saturable-absorber mirror," Optics Letters, vol. 24, December 1999, pp. 1768–1770.

Most passively modelocked lasers have been operated at repetition rates of approximately 100 MHz, corresponding to a cavity length of approximately 1.5 m. This cavity length is appropriate for many applications (such as seeding a regenerative laser amplifier) and is also convenient for building laboratory-scale lasers. Previous work has been done to achieve higher repetition rates, which could be important for telecommunications and optical clocking applications (see U.S. Pat. No. 4,930,131, Sizer, "Source of high repetition rate, high power optical pulses", U.S. Pat. No. 5,274,659, Harvey, et. al., "Harmonically mode-locked laser", U.S. Pat. No. 5,007,059, Keller et al., "Nonlinear external cavity modelocked laser"; B. E. Bouma et al., "Compact Kerr-lens mode-locked resonators", Optics Letters, vol. 21, 1996, pp. 134–136; and B. C. Collings et al, "True fundamental solitons in a passively mode-locked short-cavity $Cr^{4+}$:YAG laser", Optics Letters, vol. 22, pp. 1098–2000, 1997).

For passively modelocked lasers using saturable absorber mirror devices for modelocking, the limitation on repetition rate is the onset of Q-switching instabilities (see C. H önninger et al., "Q-switching stability limits of continuous-wave passive mode locking," J. Opt. Soc. Am. B, vol. 16, pp. 46–56, 1999.U. Keller et al., "Semiconductor saturable absorber mirrors for femtosecond to nanosecond pulse generation in solid-state lasers," Journal of Selected Topics in Quantum Electronics (JSTQE), vol. 2, no. 3, pp. 435–453, 1996, and U. Keller, "Ultrafast all-solid-state laser technology", *Applied Physics. B*, vol. 58, pp. 347–363, 1994). This has also limited the laser repetition rate to the range of several hundred megahertz typically. Using the technique of coupled cavity modelocking (RPM), a repetition rate of 1 GHz was demonstrated (see U. Keller, "Diode-pumped, high repetition rate, resonant passive mode-locked Nd:YLF laser", Proceedings on Advanced Solid-State Lasers, vol. 13, pp. 94–97, 1992). However this is a much more complicated laser due to the additional laser cavity which has to be carefully aligned with the main laser cavity.

Recently, passive modelocking in solid-state lasers has been achieved at fundamental repetition rates beyond 1 GHz. It has been found that if the product $(F_{laser}/F_{sat,laser}) \cdot (F_{abs}/F_{sat,abs}) > \Delta R$, QML operation is prevented. In this relation, $F_{laser}$ is the fluence in the laser material, $F_{sat,laser} = h\nu/(\sigma_{em,laser} + \sigma_{abs,laser})$ is the saturation fluence of the laser material, h is Planck's constant, $\nu$ is the center laser frequency, $\sigma_{em,laser}$ is the laser emission cross-section section, $\sigma_{abs,laser}$ is the laser absorption cross-section at the laser wavelength, $F_{abs}$ is the fluence on the absorber device, $F_{sat,abs} = h\nu/\sigma_{abs}$ is the effective saturation fluence of the absorber, where $\sigma_{abs}$ is the effective cross-section parameter of the absorber device, and $\Delta R$ is the modulation depth of the absorber device. As a material, Nd:Vanadate having a relatively high stimulated emission cross section is well-suited for this use.

However, Nd:Vanadate and similar Nd-doped crystals and glasses have fixed laser wavelengths, mostly near 1064 nm, with weaker laser transitions near 1340 nm and 946 nm. For applications in telecommunication systems, it is most desirable to operate at wavelengths in the established (defined by the ITU standard) wavelength range of approximately 1525–1560 nm—the so-called "C-band", and potentially the adjacent "S-band" (1450–1510 nm) and "L-band" (1570–1620 nm).

One solution to achieve these wavelengths using a passively mode-locked Nd:Vanadate laser at high repetition rates is to use frequency conversion techniques such as an optical parametric oscillator. This is the basis for the patent application PCT/IB00/01040. This approach has the advantage of potential very broad tunability, at the expense of an additional frequency conversion stage, which increases the complexity and cost of the entire system.

It would be more desirable to have a laser system to directly generate wavelengths in the communications wavelength bands to decrease cost and complexity. There are several possibilities which are known: $Cr^{4+}$:YAG, bulk Er:glass, Er:glass fiber lasers, semiconductor lasers, Er-doped crystals such as Er:Vanadate. Each has certain constraints and trade-offs.

The $Cr^{4+}$:YAG, for example, has a large laser cross-section ($3.4 \times 10^{-20}$ cm$^2$) but a very short upper state lifetime, resulting in a laser with very low small-signal gain (approximately 100 times smaller than Er:Yb:glass). This makes designing an efficient and robust laser difficult. In addition, the preferred pump wavelength of 1064 nm requires a large, powerful, Nd:YAG or Nd:Vanadate system with a near-diffraction-limited output beam, due to the low absorption coefficient at the pump wavelength. This is both expensive and not conducive to miniaturization. Finally the crystal quality of Cr:YAG is still an issue, as it is reportedly difficult to get good quality crystals, even in small quantities.

Semiconductor lasers have also been demonstrated to work at very high repetition rates and at telecom wavelengths. Semiconductor lasers however suffer from low average power typically. Also the structures required to achieve passive modelocking can be rather complicated requiring many different process steps in the fabrication.

Fiber lasers have also been demonstrated to work at very high repetition rates and at telecom wavelengths. However these lasers can be very complex and always require some technique to increase the repetition rate above the fundamental cavity repetition rate (i.e. harmonic mode-locking) since the use of fiber and fiber-optic elements require cavity lengths on the order of several or many centimeters. This is due to the fact that the available gain per meter in erbium-doped fiber is small and therefore requires laser lengths of several meters typically. This effectively precludes a mode-locked laser with a fundamental cavity repetition rate of 10 GHz or higher (corresponding to a physical cavity length of approximately 1 cm or shorter) (see Thoen, et. al, "Stabilization of an active harmonically mode-locked fiber laser using two-photon absorption," Optics Letters, p. 948, year 2000, and see also U.S. Pat. No. 6,108,465 (Ando PGL), U.S. Pat. No. 5,926,492 (NTT PGL), and U.S. Pat. No. 5,590,142 (BT Ring Laser)). In addition, fiber lasers tend to require multiple intracavity components such as beamsplitters, wavelength combiners. polarizers, polarization controllers, waveplates, and saturable absorber elements. This can increase the cost and complexity of these systems substantially. Current commercially available laboratory systems use active modulators which require large RF or microwave drive signals.

Waveguide lasers also have been demonstrated with passive modelocking (J. B. Schlager, et. al., CLEO 2001 Technical Digest, paper CMS1, p.87–88, and Thoen, et. al., "Er:Yb waveguide laser mode-locked with a semiconductor saturable absorber mirror," IEEE Photonics Technology Letters 12, p. 149 (2000)). In these state of the art lasers, the resonator contains descrete optics and the waveguide part occupies only a fraction of the resonators optical path. Here, the motivation is to improve the QML threshold through the confinement of the laser mode in the waveguide, which reduces the saturation fluence in the laser medium, and thus the QML threshold. However, waveguide lasers tend to suffer from low average power due to limits of coupling the pump laser into the waveguide, and the high optical loss typical of waveguide structures. Also it can be difficult to achieve enough gain per unit length so that very short waveguides can be realized.

Diode-pumped bulk Er-doped lasers have been previously demonstrated in continuous-wave operation with good lasing performance (Laporta, et. al, Optics Letters 1993, p. 1232). Bulk Er-doped lasers have been actively modelocked (Laporta, et. al., Photonics Technology Letters, Vol. 7, 1995, p. 155) at gigahertz repletion rates, and also have been passively mode-locked to demonstrate picosecond and sub-picosecond (Spühler et. al., Electronics Letters Vol. 35, no. 7, 1999, pp. 567–569, also G. Wasik, et. al., CLEO 2001 Technical Digest, paper CMA4, pp. 3–4), but at sub-gigahertz repetition rates only. The quality of Er-doped glass is very high, and the cost can be very low (it is similar to the material that is used to make erbium-doped fiber amplifiers (EDFAs) for example). However all erbium-doped laser materials have a very small stimulated emission cross section (e.g. $8 \times 10^{-21}$ cm$^2$ for Er-doped glass) and this would lead one to conclude that due to the above condition, operation at high repetition rates is not possible. This has so far been confirmed by experimental results (see prior references above). Alternate solid-state crystals include for example Er-doped Vanadate (cross section of $5-10 \times 10^{-21}$ cm$^2$, see Sokolska, et. al., Applied Physics B (2000) DOI 10.1007/s003400000458) which has laser transitions from 1531 nm to 1604 nm, but to date has been limited to lasing at discrete wavelengths only within this range. However, the cross-section of this type of laser is not substantially better than erbium-doped glasses, although it should have mechanical properties which allow it to be pumped with higher power. Also, lasers with only erbium-doping are typically in efficient due to strong reabsorption losses, which are caused by the typically high erbium-doping required for a reasonable pump absorption. Co-doping with other ions can be used to increase the pump absorption at low erbium doping in order to get good pump absorption and low reabsorption losses. Typically, for erbium-doped glasses, ytterbium (YB) is used as a co-dopant to achieve stronger absorption near 980 nm, where pump diodes are readily commercially available.

Except for the above issue with QML, Er-doped glass lasers appear very attractive for telecom operation. The material quality is very good, it can be manufactured in large volumes and for a low price, it can be pumped by diode lasers near 980 nm, similar to EDFAs which drives a reliable and low-cost pump laser market, and it has a laser transition which covers the C-band (and possibly also the "L-band"— 1570–1620 nm) approximately, so that it should have tunability from approximately 1525 nm to 1560 nm or even from 1525 to 1620 nm. In addition, a bulk laser approach has a number of advantages. First it allows us to add additional optical elements for control of the wavelength and cavity length. The features of controllable wavelength (i.e. tunability) and controllable cavity length (i.e. clock synchronization) are key features for current and future optical network systems. Secondly it allows us to use precision micro-optical packaging, which allows us to avoid having to invest in substantial amounts of semiconductor manufacturing equipment.

So the main open technical issue is if it is possible to overcome the QML threshold for a low-cross-section laser material at a wavelength near 1.55 μm. There are two prior-art techniques which have been published. First, it is possible through an inverse saturable effect such as two-photon absorption (TPA) to suppress the saturable absorber at higher intensities, and thus to improve the QML threshold condition with respect to Hönninger (referenced previously) (Schibli, et. al., "Suppression of Q-switched mode locking and break-up into multiple pulses by inverse saturable absorption," Applied Physics B, S41–S49, (2000)). However TPA is mostly important for sub-picosecond pulses (typically in the sub-200-femtosecond pulse range) where the peak powers become very large compared to the average power. The TPA at the peak of the pulses becomes less of a factor for picosecond pulses. To achieve significant TPA with sub-picosecond pulses, a saturable absorber mirror design with a special half-wave layer of InP (which has a large TPA coefficient) was specially designed. Schibli specifically discloses that for a picosecond laser, a TPA layer of 1 micron (i.e. up to about 0.65 wavelengths thick) would only decrease the QML threshold by a factor of four.

Secondly, it is possible to provide electronic feedback derived from the monitoring the laser amplitude and then controlling the pump intensity as a technique to suppress relaxation oscillations and effectively the QML behavior of the laser (Schibli, et. al., "Control of Q-switched mode locking by active feedback," Optics Letters, Vol. 26, Febuary 2001, pp. 148–150, and Joly, et. al., "Suppression of Q-switched instabilities by feedback control in passively mode-locked lasers," Optics Letters, vol. 26, May 2001, pp. 692–694, and WO 0147075A1). This pump feedback approach, essentially identical to other standard feedback systems to reduce noise in diode-pumped lasers (commonly referred to as "noise eaters") approaches, provided also the benefit of reduced amplitude noise on the output of the laser, which can also be desirable for certain applications. The disadvantage of this approach is the increased cost and complexity of such a system.

There are other effects which need to be taken into consideration for passive modelocking, and some of these effects become more critical as the repetition rate of the laser increases. It is well known that any optical feedback into the laser can cause instabilities to the mode locking performance of a passively mode-locked laser. The saturable absorber, which starts and stabilizes mode locking, also reacts to fluctuations in the laser power, which originate from optical feedback. If some parasitic pulse with a pulse energy well below the saturation energy of the saturable absorber (originating from some external reflection fed back into the cavity) is hitting the saturable absorber mirror within the saturable absorber mirror recovery time (essentially during the time, when the saturable absorber mirror is bleached), it virtually does not get attenuated by the saturable absorber mirror. Additionally, unlike the main pulse, the leading edge of this parasitic pulse does not get absorbed by the saturable absorber mirror, because it does not need to saturate the saturable absorber mirror. In this way the parasitic pulse experiences a positive net gain per round trip. In this way it can also grow and compete with the main pulse.

This picture explains why passively mode-locked lasers get more sensitive to optical feedback with increasing repetition rate: The integrated time in which the saturable absorber mirror is bleached, and thus the probability for an optical feedback to hit the saturable absorber mirror in its saturated state, increases linearly with repetition rate. Analogously, increasing the saturable absorber mirror recovery time increases the sensitivity towards optical feedback. On the other hand, decreasing the modulation depth of the saturable absorber mirror decreases the discrimination for pulse energies below the saturation energy of the saturable absorber mirror. In other words, with a lower modulation depth, a fed-back pulse gets less attenuated compared to the main pulse, as the reflectivity change for the different fluences is smaller (this discrimination effect is directly connected to the mode locking driving force, which increases with increased modulation depth).

Recapitulating, we can state that the sensitivity of a passively mode-locked laser to optical feedback increases with increasing pulse repetition rate, with increasing saturable absorber mirror recovery time, and with decreasing modulation depth of the saturable absorber mirror.

Concretely, we occasionally observed modulated optical spectra and/or multiple pulsing for lasers with repetition rates of about 10 GHz and saturable absorber mirrors with modulation depths in the range of 0.1 to 0.2%. To avoid such effects in these lasers it is very important to avoid any optical feedback. Possible sources for optical feedback are: back reflections from elements in the output beam, back reflections from leakages through mirrors, back reflections from rear faces of used optics (dielectric mirrors, saturable absorber mirror), back reflections of Brewster reflections from intracavity Brewster elements (mainly the gain). These back reflections can be avoided by corresponding means to which extreme care should be taken: The output beam should pass an optical isolator first, rear faces of all cavity mirrors should be AR coated and the substrates should be wedged, and the Brewster reflections should be blocked without back reflections.

SUMMARY OF THE INVENTION

It is thus an object of the invention to provide a passively mode-locked solid-state laser suited for operation near and around the key telecom wavelengths centered at 1550 nm and possibly other infrared or visible light frequencies for repetition rates above 1 GHz, preferably exceeding 10 GHz and possibly even exceeding 40 GHz without having to use harmonic modelocking, i.e. operating at the fundamental cavity repetition rate.

According to a first aspect of the invention, a laser for emitting a continuous-wave train of electromagnetic-radiation pulses characterized by an effective wavelength is provided, the fundamental repetition rate of the emitted pulses exceeding 1 GHz, the laser comprising:

an optical resonator;
an Er:Yb:doped solid-state gain element placed inside said optical resonator;
means for exciting said laser gain element to emit electromagnetic radiation characterized by the effective wavelength; and
means for passive modelocking comprising a saturable absorber.

According to a second aspect of the invention, a laser for emitting a continuous-wave train of electromagnetic-radiation pulses characterized by an effective wavelength is provided, the fundamental repetition rate of the emitted pulses exceeding 1 GHz, said laser comprising:

an optical resonator;
a solid state gain element placed inside said optical resonator;
means for exciting said laser gain element to emit electromagnetic radiation characterized by the effective wavelength, said means comprising a single mode diode pump laser; and
means for passive modelocking comprising a saturable absorber.

According to a further aspect of the invention, a laser for emitting a continuous-wave train of electromagnetic-radiation pulses characterized by an effective wavelength is provided, the fundamental repetition rate of the emitted pulses exceeding 1 GHz, said laser comprising:

an optical resonator;
a solid state gain element placed inside said optical resonator;
means for exciting said laser gain element to emit electromagnetic radiation characterized by the effective wavelength, and
means for passive modelocking comprising a (for example "low-finesse") saturable absorber mirror with a stack of alternating GaAs/AlAs layers and a less than or equal to 10 nm thick absorber layer comprising $In_xGa_{1-x}As$ with $0.48<x<5.58$, preferably $0.5<x<0.56$.

According to yet another aspect of the invention, a laser for emitting a continuous-wave train of electromagnetic-radiation pulses characterized by an effective wavelength is provided, the fundamental repetition rate of the emitted pulses exceeding 1 GHz, said laser comprising:

an optical resonator;
an Er:Yb: doped solid-state gain element placed inside said optical resonator;
means for exciting said laser gain element to emit electromagnetic radiation characterized by the effective wavelength; and
means for passive modelocking comprising a saturable absorber,
wherein the optical resonator is designed such that the circulating radiation is focused in a manner that the spatial mode radius on both, the gain element and the absorber is below 50 $\mu$m.

The invention also comprises a method for emitting a continuous-wave train of electromagnetic-radiation pulses characterized by an effective wavelength, the pulses being emitted with a fundamental repetition rate exceeding 1 GHz, comprising the steps of:

exciting an Er:Yb: doped solid laser gain element to emit electromagnetic radiation characterized by the effective wavelength,
said laser gain element being placed inside an optical resonator;
recirculating said electromagnetic radiation in said optical resonator; and passively modelocking said electromagnetic radiation using a saturable absorber.

According to a still further aspect of the invention method for emitting a continuous-wave train of electromagnetic-radiation pulses characterized by an effective wavelength is provided, the pulses being emitted with a fundamental repetition rate exceeding 1 GHz, comprising the steps of:

Focusing an optical pumping beam on a solid state laser gain element for exciting it to emit electromagnetic radiation characterized by the effective wavelength, said laser gain element being placed inside an optical resonator;

recirculating said electromagnetic radiation in said optical resonator, passively modelocking said electromagnetic radiation using a saturable absorber, and focusing said electromagnetic radiation such that the spatial mode radius on the gain element is below 80 μm, preferably below 50 μm and on the absorber is below 50 μm.

In summary, features distinguishing different aspects of the invention from the prior art comprise:

An Er:Yb:doped solid-state laser gain element, e.g. a Er:Yb:glass, an Er:Yb:YAG or an Er:Yb:Vanadate laser gain element or any other bulk laser gain element which is doped with Er and Yb. In the following description, it is assumed that the laser gain element is a Er:Yb:glass gain element. The co-doping of the Yb has been observed to have a positive effect on an efficient pump absorption, as it allows for an efficient laser with a short gain element and thus for a very small laser mode in the gain still efficiently mode-matched to the pump radiation, which in turn allows to improve the S parameter in the laser crystal.

High-brightness pump laser, at least 0.1 W, preferably at least 0.2 W or 0.3 W or more from a single-mode diode laser at approximately 980 nm wavelength, but it can also be a 50 micron stripe laser with approximately 1W output power or similar high-brightness pump laser. The pump laser can also be either free-space coupled or possibly fiber-coupled Cavity designs optimized for low-optical loss and specially to avoid spurious reflections which could give rise to unwanted etalon effects and optical feedback which subsequently disturb the mode-locked operation. Mirror elements should be highly reflective >99.9%, preferably 99.95%, and output coupler is in the range of 0.2% to 2% or 0.2% to 1% typically.

Cavity designs which, despite the—due to the high fundamental repetition rate—limited size allow focusing of the pump beam and of the beam circulating in the resonator. In fact, the mode radius on the absorber and on the gain element is below 50 μm, preferably below 20 μm on the absorber and below 30 μm in the gain material.

Saturable absorber mirror with a GaAs/AlAs layer stack and a thin absorber using approximately $In_xGa_{1-x}As$ with x=53±5%, preferably 53%±3%, and ideally 53%±1%. No structures to enhance TPA are used, and we expect negligible TPA effects.

we have solved the "problem" of highly lattice mismatched, relaxed absorber layers by using thin layers grown at low-temperatures between 250 and 500° C. and as near the surface of the saturable absorber mirror structure (i.e. minimizing the amount of material grown on top of the absorber) as possible. 'Near the surface of the saturable absorber mirror structure' in this context means essentially within 200 nm from the surface, preferably within 125 nm from the surface and probably even within 110 nm from the surface.

saturable absorber mirror designed to have modulation depths below 0.5% (to as low as below 0.1%) and non-saturating loss of <0.5% (similar or better than standard dielectric mirrors.)

The invention makes possible a solid state laser, passively modelocked at or around an effective wavelength of 1550 nm with a saturable absorber mirror, with an enhanced QML factor (definition in next paragraph) which makes possible very high repetition rates according to special embodiments even exceeding 40 GHz in a fundamental cavity arrangement.

The invention is based on a variety of surprising insights: A first surprising effect is that a bulk Er:Yb: doped solid is highly suited as a gain material. One reason therefor is the discovery that a bulk Er:Yb: doped solid state laser can be designed to achieve passive CW modelocking with a pulse energy which is substantially lower than that predicted by the accepted QML condition. This is by combining some or all of the above features in one laser. In the following, the decrease in pulse energy compared to the predicted pulse energy is called the "QML factor" q. It may be observed that the QML factor is improved by a factor of between 2 to 4 or even 5 to 30 for the preferred embodiments, compared to the standard expected QML threshold. In other words, it is observed that instead of $(F_{laser}/F_{sat,laser})·(F_{abs}/F_{sat,abs})>\Delta R$, the relation $q^2(F_{laser}/F_{sat,laser})·(F_{abs}/F_{sat,abs})>\Delta R$ holds. This is using a "standard" saturable absorber mirror designed for an absorption wavelength of 1.55 micron, without any special layers included for extra TPA. Thanks to this effect, higher repetition rates are possible without coming into a Q-switched-mode-locked regime.

Further, by choosing an Er and Yb doped gain element, a gain element is used, by which a high gain per unit length is achieved. In this way, in a cavity for very high repetition rates, enough small signal gain is available to overcome the Q-switched mode locking (QML) threshold. In the 1.5 μm regime, a preferred material is a solid-state Erbium—Ytterbium doped phosphate glass element. The Yb-co-doping permits an efficient pump absorption in a short length. The energy is then efficiently transferred from the Ytterbium ions to the Erbium ions. In this way a high Erbium doping can be avoided, which would be detrimental for a quasi-three-level laser, due to its reabsorption losses.

A second surprising insight used for a variety of embodiments is that a laser cavity with a GHz fundamental repetition rate can be designed in a manner that, in order to decrease the QML threshold, focusing to very small mode radii on both, the gain material and an absorber element is possible. To this end, as outlined below, mirrors with curve radii well below what has previously been expected are used. Nevertheless, the losses are small or tolerable.

The scalability of this approach reaches its limits only around repetition rates of about 40 GHz, as the cavity length gets below 4 mm or even at higher repetition rates. As the cavity becomes even smaller, it, however, becomes difficult to physically build a cavity which fulfils all above requirements using discrete cavity elements.

A saturable absorber may be used which allows for custom design of the absorber parameters, particularly to suppress Q-switched mode locking. Here a preferred choice is a absorbing mirror device such as a SESAM™ device.

The saturable absorber parameters may, for example, be adjusted so that at the chosen mode area on the absorber, it still is operated at a fluence value which is by a factor of 5–10 or 5–15 above its saturation fluence.

A third surprising insight, which is used for preferred embodiments, is that despite a huge lattice mismatch (several %), 'standard' InGaAs absorber layers can, in an absorbing mirror device, be used together with a 'standard' GaAs/AlAs Bragg mirror element for operation around 1550 nm. Since the In concentration in an absorber layer is given by the wavelength and must be very high, the lattice mismatch in state of the art saturable absorber devices made a use of InGaAs absorbers impossible due to bad quality growth due to relaxation. According to an aspect of the invention, very thin absorber layers grown at very low temperatures are used. For InGaAs absorbers and GaAs spacers, the two-photon-absorption (TPA) is expected to be low. Thus the enhanced QML factor of the laser according to the invention is based on principles so far not known. In fact very weak or even negligible TPA may be expected in this structure due to the use of GaAs space layers. GaAs has a bandgap of 830 nm, so that the TPA coefficient for 1550 nm photons is substantially lower than InP for example (26 cm/GW versus 90 cm/GW respectively).

Recently, new saturable absorber designs have been invented, which make a wide range of saturation fluences and modulation depths available. Some have been described (c.f. U. Keller et al., Journal of Selected Topics in Quantum Electronics 2, p. 435 (1996)), for others, patent applications are pending. (U.S. patent application Ser. No. 10/016,530 filed on Dec. 12, 2001, and a U.S. patent application Ser. No. 10/097,500 filed Mar. 14, 2002).

A fourth surprising insight, upon which some embodiments are based, is that a single mode semiconductor pumping laser can be combined with a solid state gain element in a high repetition rate laser, and, together with other features of the invention produce a solid state laser with a repetition rate so far not known.

According to a special embodiment, the above mentioned limitations of very small cavities are overcome by providing an approach for building a laser which allows scaling to higher fundamental repetition rates, i.e. 40 GHz or more, for example 160 GHz.

According to the this special embodiment, in the following called quasi-monolithic embodiment, a laser is provided, comprising a guided high gain Erbium and Ytterbium co-doped gain element and further comprising means for implementing passive mode locking.

With the approaches according to this special embodiment of the invention, high gain is reached in a short length and simultaneously a very small mode size in the gain medium and on the saturable absorber. The preferred mode diameter for this device would be below 10 microns, and even possible 4 to 5 microns. The guided Erbium gain element can for example have either a fiber shape or a waveguide shape. Ytterbium doping in addition to the Erbium doping allows for efficient pump absorption in a short fiber/waveguide length. The saturable absorber device is designed so that its saturation fluence is about 1/5–1/10 (one-fifth to one-tenth) or 1/5–1/15 (one fifth to one fifteenth) of the fluence hitting the saturable absorber, given by the intracavity power, cavity length and mode area of the fiber/waveguide.

The guided gain element could also be a double clad structure, where the pump light is not guided in its fundamental transverse mode but in a higher order mode. The Er:Yb:-doped region, however, is limited to the core, which guides the 1.5 μm electromagnetic radiation in a single transverse mode. This allows the use of the pump with worse beam quality but requires a special coating for high reflectivity at the pump wavelength on the ends of the gain element and thus still efficient pump absorption in spite of the worse mode overlap of pump and laser mode.

More in general, the invention also comprises a quasi-monolithic passively mode-locked guided-wave laser. "Quasi-monolithic" means that all or essentially all elements of the laser cavity are essentially in contact to each other. Especially, a quasi-monolithic cavity is free of transfer optic elements such as lenses, deflecting mirrors etc. This refers to any gain material which also guides the cavity radiation.

The invention, accordingly in general comprisies a laser for emitting a continuous-wave train of electromagnetic-radiation pulses comprising an optical resonator, means for passive modelocking comprising a saturable absorber, and a gain element, wherein said gain element is formed as to guide electromagnetic radiation, and wherein at least one end face of said gain element forms an end face of said optical resonator. It further comprises a laser having a guided high gain Erbium and Ytterbium co-doped gain element and further comprising means for implementing passive mode locking. It also comprises in general a quasi-monolithic passively mode-locked guided-wave laser designed for pulse repetition frequencies exceeding 10 GHz.

Further optional features of a laser according to the invention are:

An absorbing reflector structure with a back-side wedged and/or roughened to avoid spurious reflections from the back surface which create a disturbing etalon effect.

Optional tuning elements: one or a combination of the following:

Solid etalon, for example a glass etalon having a thickness of between 10 μm and 100 μm thickness or an etalon of a material with a higher refractive index such as Si, the thickness being appropriately scaled. More in general, the etalon thickness for example is scaled such the free spectral range is broad enough, namely for example at least 1 THz, preferably at least 5THz. (Knowing the refractive index, the expert will readily know how to choose the etalon thickness to achieve this goal.)

Air-spaced etalon with air gap, preferably in the sub-100 μm range, for example in the 25–100 μm range or in a range of 10–100 μm or even smaller Micro-electro-mechanical System (MEMS)-based etalon structure birefringent filter tuning the angle of the gain element in the case when it is a Brewster-Brewster plate changing the position of the saturable absorber mirror or another mirror element in the cavity to change the laser mode, effectively changing the saturated gain of the laser causing a tuning of the wavelength.

According to an embodiment, a micro-optics arrangement is chosen, which allows the combination of this laser with means to tune and lock the laser wavelength, at the same time to tune and lock the cavity length of the laser to synchronize the pulse repetition rate to a master reference clock.

DESCRIPTION OF THE PREFERRED EMBODIMENTS

Figure 1:
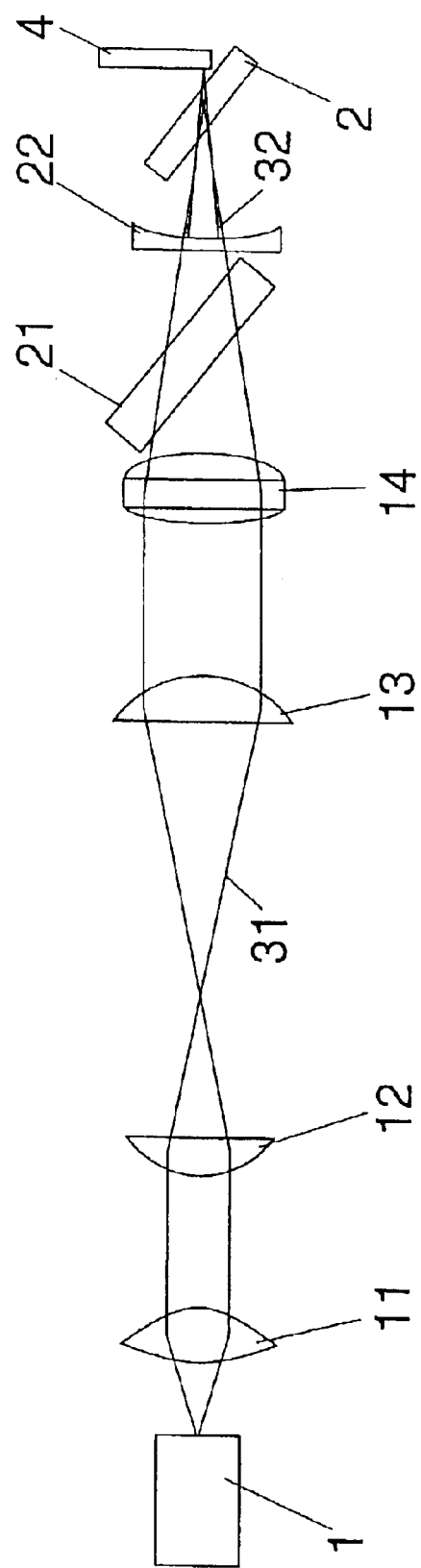
FIGS. 1–4 show embodiments of a laser according to the invention.

In one preferred embodiment, the invention uses a saturable absorber mirror device with less than 1% and even more preferably less than 0.5% modulation depth and an Er:Yb:glass gain element. Referring to FIG. 1, a high-brightness, single-mode diode laser 1 (Nortel Model G06d), which emits 980 nm laser light 31 of up to 0.5W from an aperture size of approximately 1.8 $\mu$m by 4.8 $\mu$m, is collimated by a short focal length high numerical aperture aspheric pickup lens 11 (focal length 4.5 mm). The beam is then expanded in tangential direction with help of a ×2 (times-two) telescope made of cylindrical lenses 12, 13. This telescope turns the elliptic pump beam into an approximately round one and it allows for astigmatism compensation.

An achromatic lens 14 is used to focus the pump beam 31 through one cavity mirror 22 down to a radii between 20 and 80 $\mu$m in the free space. Between the focusing lens 14 and the cavity mirror 22, we placed a dichroic beam splitter 21 (highly reflective for wavelengths around 1550 nm and highly transmissive around 980 nm under 45° incidence) in order to deflect any laser light directed to the pump laser 1. At the focus of the pump light 31, approximately 0.45 W of pump power was measured at a pump wavelength of nominally 980 nm, which is then available for optically pumping a laser gain element 2. Although single-mode pump diodes are preferable, other formats pump diodes may also be used with properly designed pump optics. For example a 1W output power from a 1×50 micron aperture broad area diode laser (slightly reduced brightness, but still a so called high-brightness pump laser) emitting at substantially 980 nm (Boston Laser Model 1000-980-50) can also be used to achieve good lasing performance. The advantage of the higher brightness, and in particular the single-spatial-mode diode laser, which has very high brightness, is that for a given pump mode radius the divergence of the pump beam is smaller. This allows for mode matching of the pump beam to the laser mode over the entire length of the gain element even for very small laser and pump spot sizes and thus results in a maximized saturation parameter $S_{laser}$ of the laser ($S_{laser}=F_{laser}/F_{sat,laser}$). The number of elements of the pump optics can be reduced by using special astigmatic lenses. Likewise a fiber coupled pump element with a comparable brightness can be used.

This pump source (using varying focal length of the achromatic lens 14) is used for four different laser set-ups which all have in common that they have a small laser mode size in the gain medium as well as on the saturable absorber mirror. These small mode areas are crucial to suppress the laser from operating in the QML regime. The gain element in all these four cavities is a 1 mm thick Kigre QX/Er phosphate glass doped with 0.8% Erbium and 20% Ytterbium (i.e., the glass melt was doped with 0.8% $Er_2O_3$ and with 20% $Yb_2O_3$). The thickness of the gain medium is chosen to be not significantly more than the absorption length, to minimize the re-absorption losses. The described laser cavities contain a Brewster/Brewster-cut gain element. Analogous cavities can be done with flat/Brewster or flat/flat gain elements, compensating for the change in astigmatism.

In the following, different kinds of cavity designs are described. In the description and the figures, corresponding reference numerals always refer to corresponding items.

A straight cavity is shown in FIG. 1: The laser resonator is formed by just two mirrors, one of which is the saturable absorber mirror device 4 and the other one is a concave curved mirror 22. The curved mirror 22 serves as output coupler and has a transmission in the range of 0.2–2% typically at the laser wavelength (around 1550 nm) and is highly transmissive at the pump wavelength (around 980 nm). The Er:Yb:glass gain element 2 is inserted under Brewster angle close to the focus of the pump light 31, located close to the active saturable absorber mirror surface. The gain element has dimensions of 9×9 $mm^2$ in cross-section with a nominal length of approximately 1 mm. (note that the gain element can also be a flat/Brewster shaped element or a flat/flat shaped element with an additional polarization selective element in the cavity). The cavity length is set according to the required laser repetition rate (e.g. about 15 mm for 10 GHz operation). The curvature of the curved mirror 22 is chosen to be slightly larger than the optical length of the cavity to enforce the laser to oscillate close to the stability limit, where the mode size on the saturable absorber mirror becomes small (Thermal lenses in the gain element can shift the stability regions slightly). This design procedure is using the well-known ABCD matrix technique described, e.g., in A. E. Siegman, Lasers, Mill Valley (Calif.), University Science, 1986. The mode size of the pump light 31 in the gain element has to be about equal to the mode size of the laser light 32 at this position. This sets the focal length of the focusing lens 14. The laser output is collinear to the pump light 31 and reflected on the dichroic mirror 21. This straight cavity is very simple, easy to align, and uses the minimum number of parts required for a non-monolithic mode-locked laser resonator.

In one specific embodiment, we choose the concave curved mirror 22 to have a radius of curvature of 15 mm, a reflectivity of 99.8% at 1550 nm (allowing the laser beam to partially couple out of the cavity here). The distance between the Er:Yb:glass 2 to the mirror 22 is approximately 12.2 mm, the distance from the Er:Yb:glass 2 to the saturable absorber mirror 4 is 1 mm. This gives a nominal total cavity length of approximately 15.0 mm (taken into account the effective length of the laser gain element 2, i.e., its index of refraction of n=1.521 times its physical length along the optical path of 1.2 mm) which corresponds to a nominal free spectral range (i.e., laser repetition rate) of 10 GHz. In this configuration, the mode radius in the gain medium is 73 μm in the tangential plane and 46 μm in the sagittal plane. The mode radii on the saturable absorber mirror are 47 μm and 43 μm, respectively.

Figure 2:
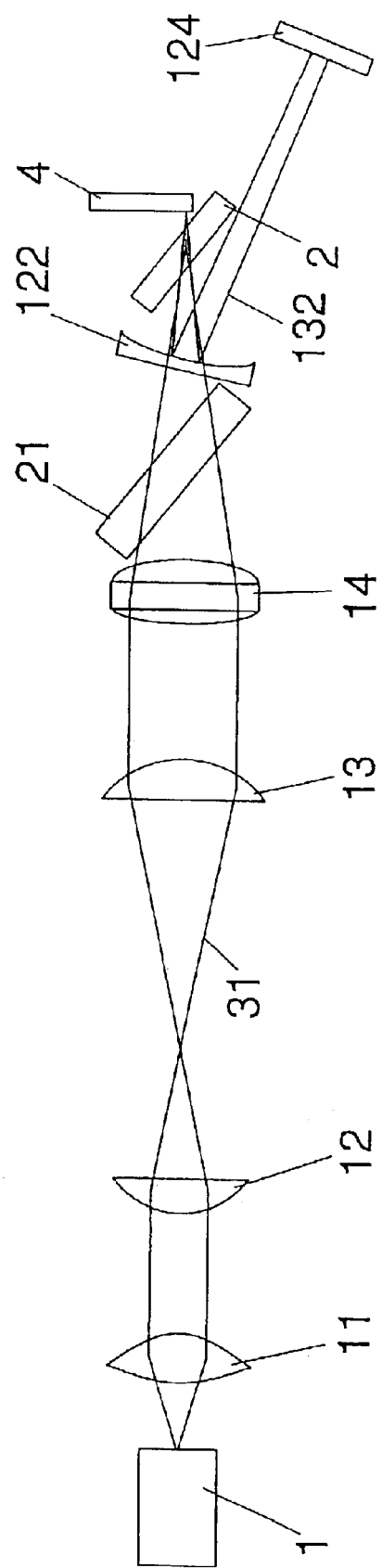

Next, referring to FIG. 2, a first kind of a dog leg cavity is described: The laser resonator is formed by three mirrors, one of which is the saturable absorber mirror device 4, another one is a concave curved mirror 122 (high reflectivity around 1550 nm; high transmission around 980 nm) and the third one is a flat wedged output coupler with a transmission of 0.2–2% at the laser wavelength (around 1550 nm). The Er:Yb:glass gain element 2 is inserted under Brewster angle close to the focus of the pump light 31, located close to the active saturable absorber mirror surface. The gain element has dimensions of 9×9 mm$^2$ in cross-section with a nominal length of 1 mm (note that the gain element can also be a flat/Brewster element or a flat/flat shaped element with an additional polarization selective element in the cavity). The cavity length is set according to the required laser repetition rate (e.g. about 15 mm for 10 GHz operation). The curvature of the curved mirror 122 can now be much smaller than the cavity length (e.g. radius of curvature 5 mm) compared to the straight cavity of FIG. 1. This allows for even smaller mode sizes of the laser light in the gain medium and on the saturable absorber mirror. The mode size of the pump light 31 in the gain element has to be about equal to the mode size of the laser light 132 at this position. This sets the focal length of the focusing lens 14. The laser output is now decoupled from the pump light. The dichroic mirror 21 is then used to avoid any feedback of laser light leaking through the high reflector 122 into the pump laser or the pulse generating laser itself. This cavity design allows for even smaller mode sizes in the gain medium and on the saturable absorber mirror for a fixed pulse repetition rate than the straight cavity design. This is helpful to overcome Q-switched mode locking and helps to saturate the saturable absorber mirror more strongly. Additionally it reduces the working distance, i.e. the distance between pump focusing lens 14 and gain element 2, which reduces the requirements on the brightness of the pump laser and allows to use smaller aperture optics for the elements 21 and 22. On the other hand it is more complex than the straight cavity shown in FIG. 1 and requires more elements.

In one specific embodiment, we choose the curved high reflecting mirror 122 to have a radius of curvature of 20 mm, and the flat mirror 124 to have a reflectivity of 99.8% at the laser wavelength. The distance between the Er:Yb:glass 2 and the curved mirror 122 is approximately 8.7 mm, the distance between the Er:Yb:glass 2 and the saturable absorber mirror 4 is approximately 1 mm, and the distance from the curved mirror 122 to the output coupler 124 is 48.8 mm. This gives a nominal total cavity length of approximately 60 mm (taken into account the effective length of the laser gain element 2, i.e., its index of refraction of n=1.521 times its physical length along the optical path of 1.2 mm) which corresponds to a nominal free spectral range (i.e., laser repetition rate) of 2.5 GHz. In this configuration, the mode radius in the gain medium is 53 μm in the tangential plane and 39 μm in the sagittal plane. The mode radii on the saturable absorber mirror are 20 μm and 20 μm, respectively.

Figure 3:
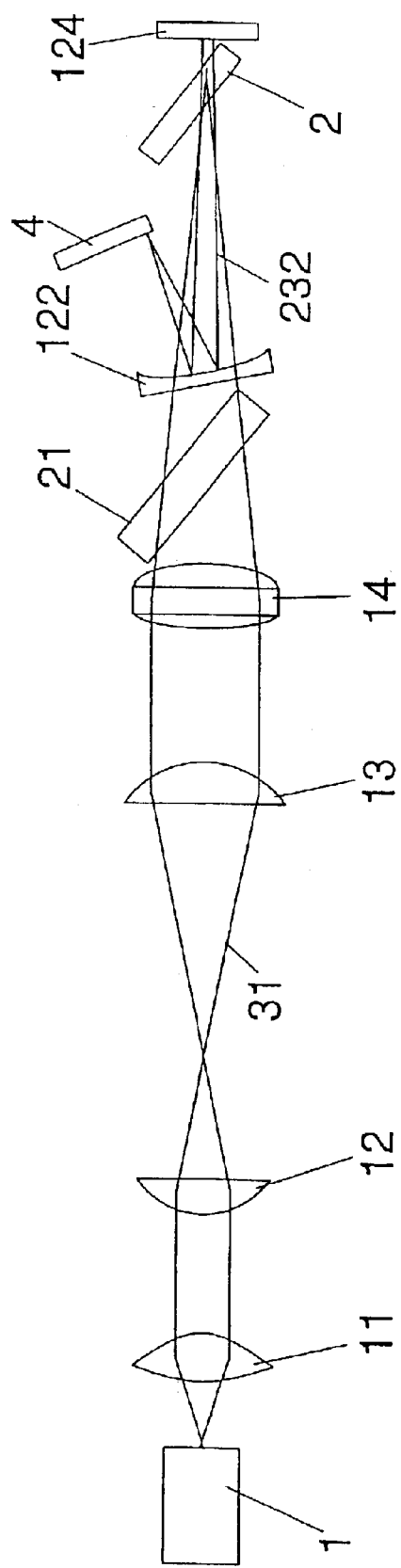

A second dog leg cavity is shown in FIG. 3. This laser resonator is formed by three similar mirrors as the resonator of FIG. 2. One is the saturable absorber mirror device 4, another one is a concave curved mirror 122 (high reflectivity around 1550 nm; high transmission around 980 nm) and the third one is a flat wedged output coupler with a transmission of 0.2–2% at the laser wavelength (around 1550 nm). The Er:Yb:glass gain element 2 is inserted under Brewster angle close to the focus of the pump light 31, located close to the flat output coupler. The gain element has dimensions of 9×9 mm$^2$ in cross-section with a nominal length of 1 mm (note that the: gain element can also be a flat/Brewster element or a flat/flat shaped element with an additional polarization selective element in the cavity). The cavity length is set according to the required laser repetition rate (e.g. about 15 mm for 10 GHz operation). The curvature of the curved mirror 122 can be much smaller than the cavity length (e.g. radius of curvature 5 mm). This allows for very small mode sizes of the laser light on the saturable absorber mirror. The mode size of the pump light 31 in the gain element has to be approximately equal to the mode size of the laser light 232 at this position. This sets the focal length of the focusing lens 14. Again, the dichroic mirror 21 is then used to avoid any feedback of laser light leaking through the high reflector 122 into the pump laser or the pulse generating laser itself. This cavity design allows for independent mode size adjustment in the gain and on the saturable absorber mirror. Additionally it relaxes the mechanical constraints due to larger physical distances between the different cavity elements. On the other hand it has larger mode sizes in the gain medium for a fixed pulse repetition rate and slightly increases the working distance, compared to the cavity described referring to FIG. 2.

Figure 4:
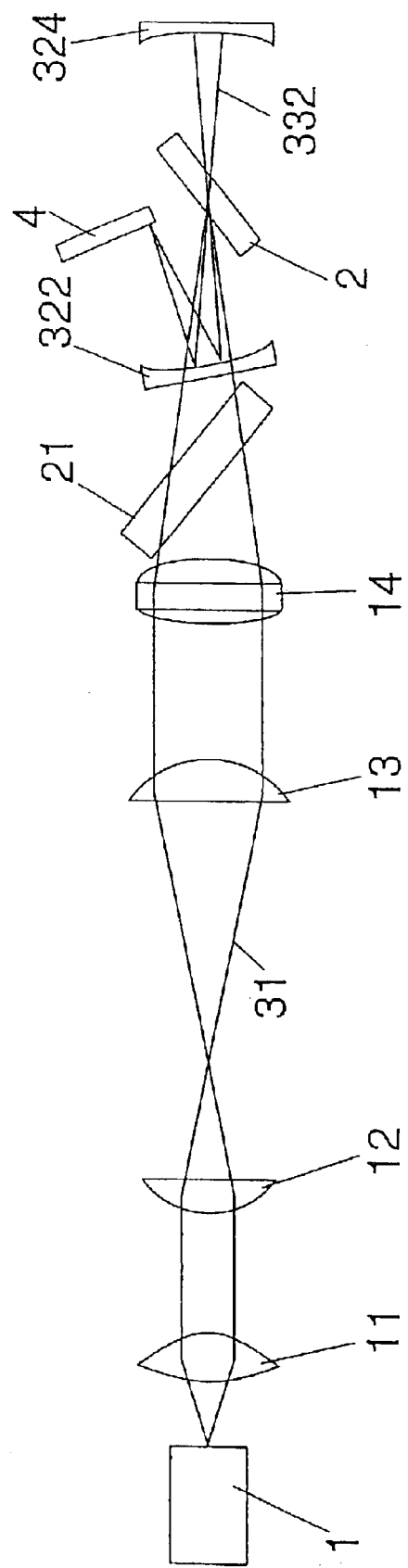

A third example of a "dog leg" cavity can be seen in FIG. 4. Also this laser resonator is formed by three mirrors. Again, one is the saturable absorber mirror device 4, but now we work with two concave curved mirrors 322, 324. The first curved mirror 322 has high reflectivity around 1550 nm and high transmission around 980 nm. The second curved mirror 324 is a concave curved output coupler with a transmission of 0.2–2% at the laser wavelength (around 1550 nm). The Er:Yb:glass gain element 2 is inserted under Brewster angle close to the beam waste of the laser beam 332 between mirror the first and the second curved mirror 322, 324. The gain element has dimensions of 9×9 mm$^2$ in cross-section with a nominal length of 1 mm (note that the gain element can also be a flat/Brewster element or a flat/flat shaped element with an additional polarization selective element in the cavity). The cavity length is set according to the required laser repetition rate (e.g. about 15 mm for 10 GHz operation). The curvature of the first curved mirror 322 can be much smaller than the cavity length (e.g. radius of curvature 4.1 mm). The curvature of the second curved mirror 324 is chosen so as to get the desired mode size in the gain medium and the desired cavity length. A reasonable value for 10 GHz operation is a radius of curvature of 5 mm. This cavity allows for very small mode sizes of the laser light in the gain medium and on the saturable absorber mirror, which in addition can be custom designed independently. The mode size of the pump light 31 in the gain element has to be about equal to the mode size of the laser light 332 at this position. This sets the focal length of the focusing lens 14. Again, the dichroic mirror 21 is then use to avoid any feedback of laser light leaking through the high reflector 322 into the pump laser or the pulse generating laser itself. This cavity combines the advantages of the cavities shown in FIGS. 2 and 3: It allows for individual adjustment of the mode sizes in the gain medium and in the saturable absorber mirror, still having small mode sizes in the gain. In addition to these advantages, this cavity design shows the smallest effect of spatial hole burning, as the gain element is located far away from the cavity end mirrors compared to the thickness of the gain element. This is beneficial to get transform-limited pulses. In terms of working distance it is a compromise of the cavities of FIGS. 2 and 3. However, the working distance is not a limiting factor when a single mode pump is used as was done in this embodiment.

Figure 5:
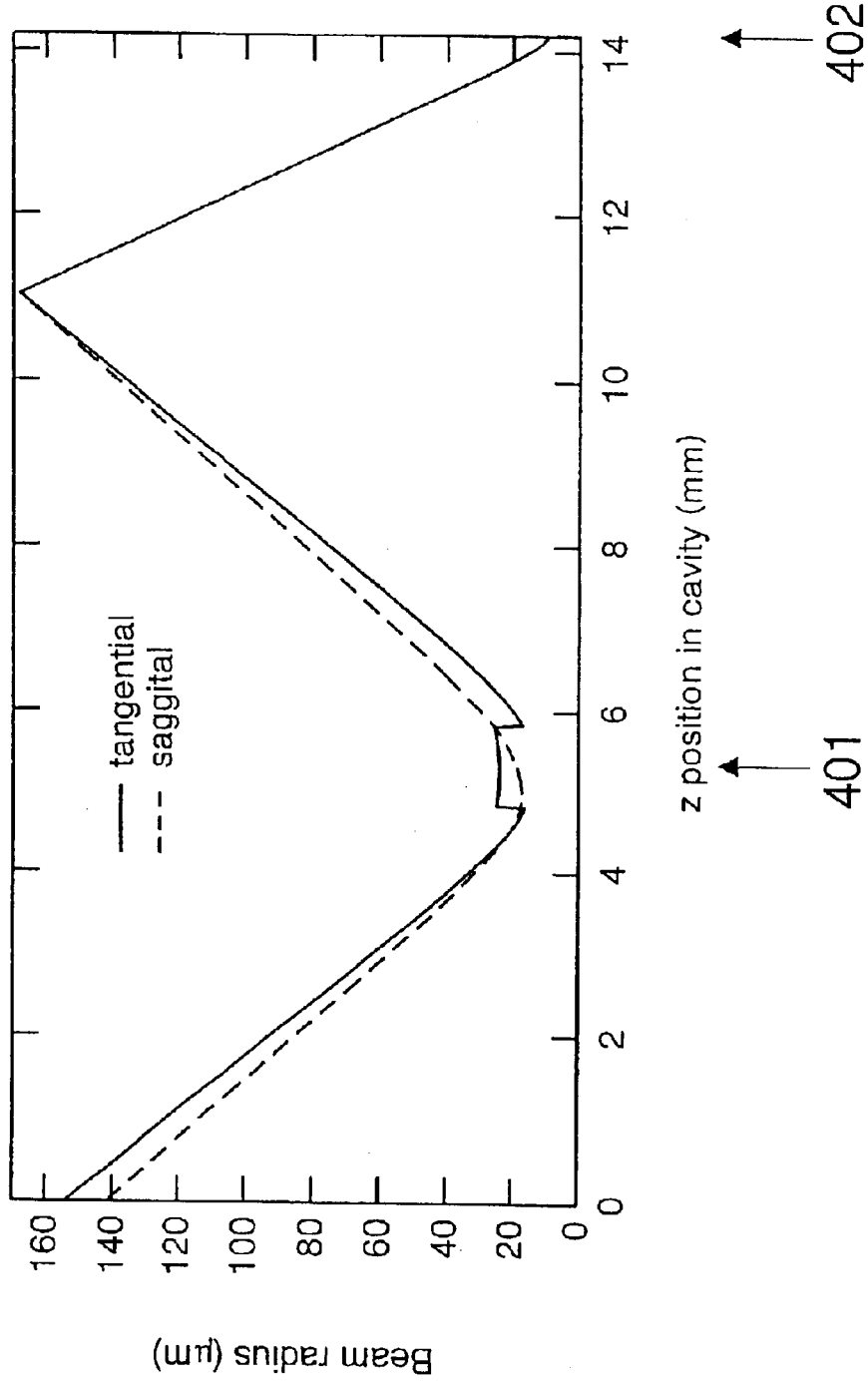
FIG. 5 shows the beam radius as a function of the position in a laser according to FIG. 4.

In one specific embodiment, we choose the first curved mirror 322, i.e. the high reflecting mirror, to have a radius of curvature of 4.1 mm, and the second curved mirror 324 to have a radius of curvature of 5 mm with a reflectivity of 99.5% at the laser wavelength. The distance between the Er:Yb:glass 2 and the first curved mirror 322 is approximately 5.2 mm, the distance between the Er:Yb:glass 2 and the curved output coupler is approximately 4.8 mm, and the distance from the first curved mirror 322 to the saturable absorber mirror 4 is approximately 3.2 mm. This gives a nominal total cavity length of approximately 15.0 mm (taken into account the effective length of the laser gain element 2, i.e., its index of refraction of n=1.521 times its physical length along the optical path of 1.2 mm), which corresponds to a nominal free spectral range (i.e., laser repetition rate) of 10 GHz. In this configuration, the mode radius in the gain medium is 24 $\mu$m in the tangential plane and 18 $\mu$m in the sagittal plane. On the saturable absorber mirror, they are 10 $\mu$m and 10 $\mu$m, respectively. The mode size, as function of the position in the cavity is shown in FIG. 5. The two beam waists for the saturable absorber mirror 402 and the Er:Yb:glass 401 can be seen clearly. In the Figure, z denotes the distance from the second curved mirror 324.

In these configurations we typically achieved average output powers between 5 to 50 mW.

Figure 6:
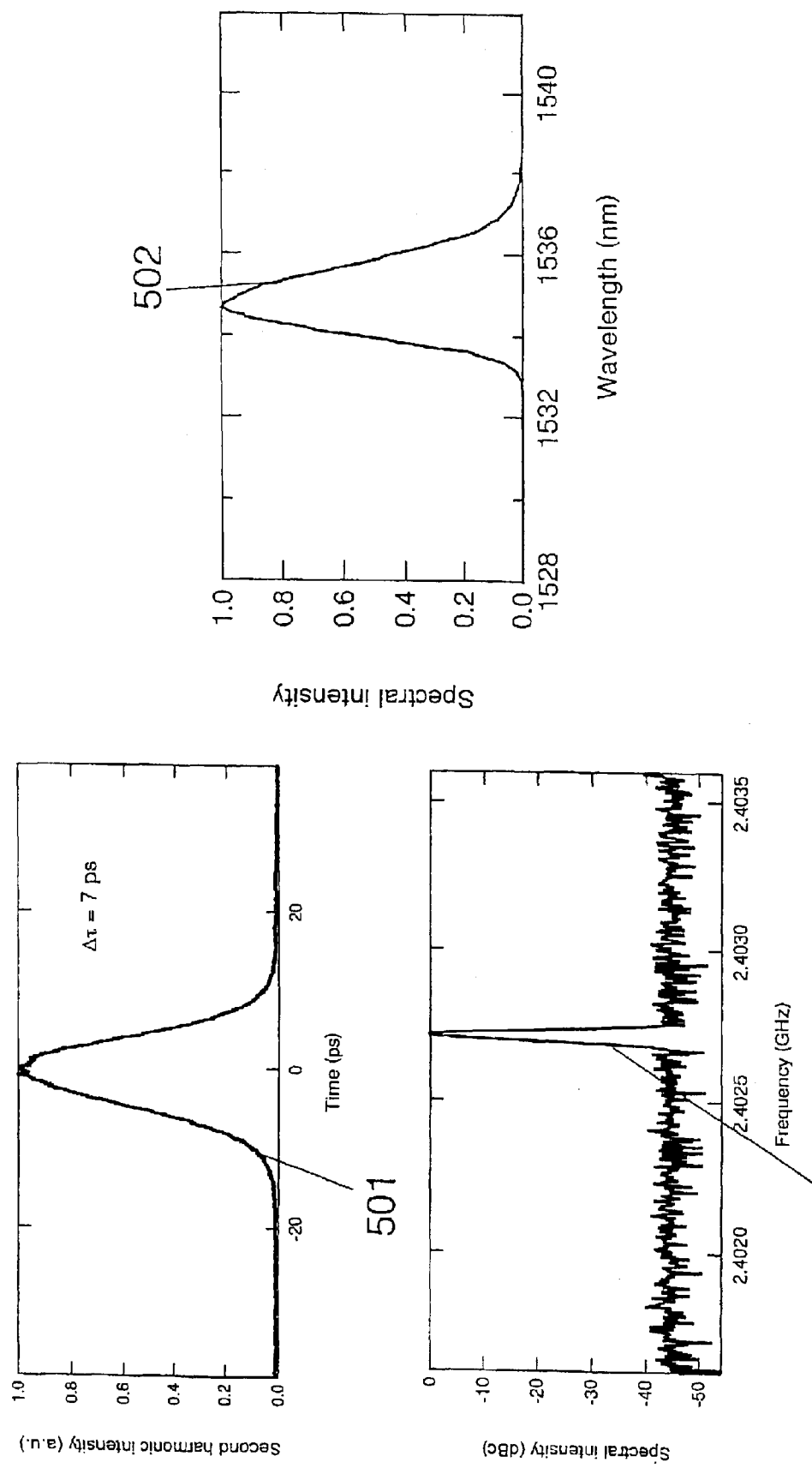
FIG. 6 depicts graphs of the autocorrelation, the optical spectrum, and the microwave spectrum of a 2 GHz laser according to the invention.
Figure 7:
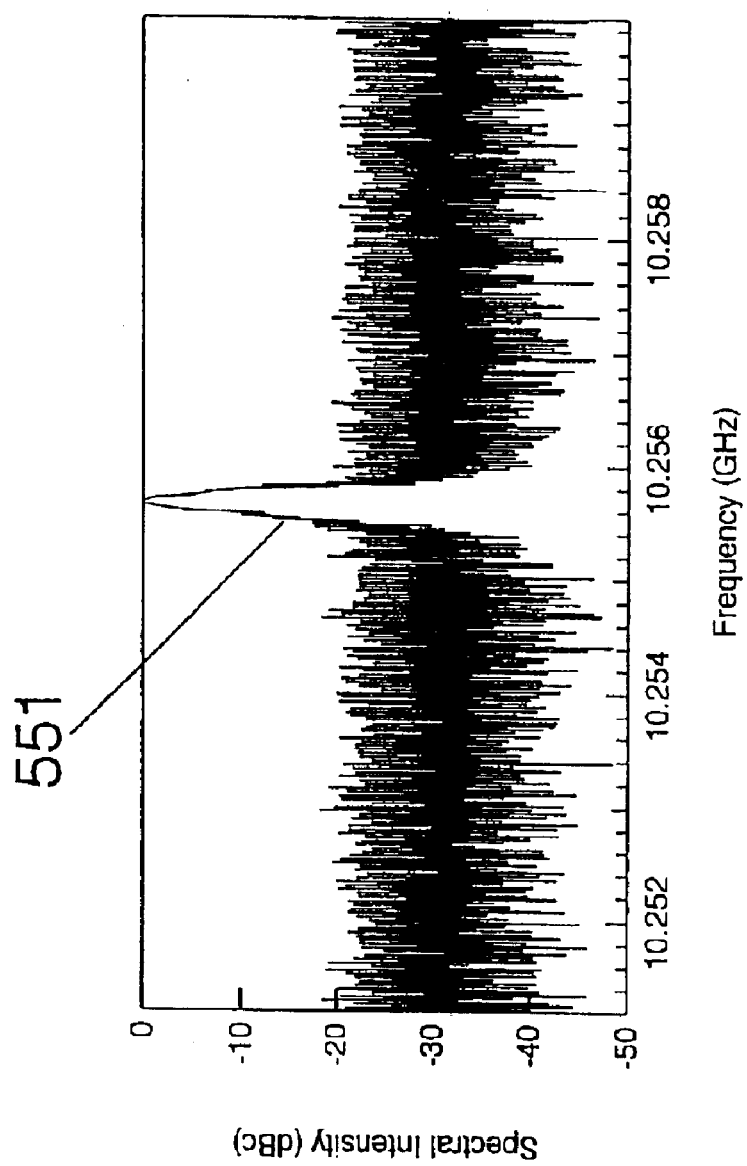
FIG. 7 shows a microwave spectrum of a 10 GHz laser according to the invention.

The basic design described above with reference to FIGS. 1–4 can be operated at frequencies exceeding 1 GHz. FIG. 6 shows data taken from a laser operating near 2.5 GHz: the autocorrelation trace 501, the optical spectrum of the laser 502 and the RF-spectrum 503 indicating clean mode-locked operation. This data is taken form a laser designed according to FIG. 2. In FIG. 7 the RF spectrum from a 10 GHz laser is shown, designed according to FIG. 4.

Figure 8:
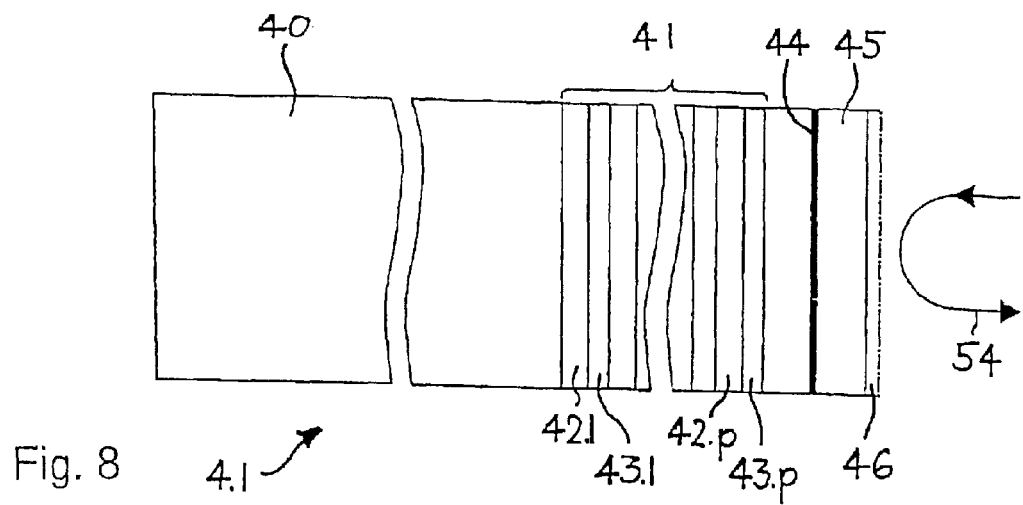
FIG. 8 depicts a saturable absorber mirror layer structure.

FIG. 8 illustrates a preferred design of a saturable absorber mirror 4.1. A dielectric stack mirror 41 (typically called a Bragg reflector) consisting of quarter-wave pairs of low-index/high-index material 42.1, ..., 42.p and 43.1, ..., 43.p, respectively. These mirrors 41 are well known to those skilled in the art of mirrors. The specific design starts with a gallium arsenide (GaAs) substrate 40 of with a thickness range of typically 400 to 650 $\mu$m. First a quarter wave layer 42.1 of a low-wave index material, in this case aluminum arsenide (AlAs) with an index of refraction of n=2.89 and a thickness of approximately 134 nm (corresponding to a quarter wavelength of 1550 nm in the AlAs), is deposited onto the substrate 40. The deposition method is typically the well-established techniques of molecular beam epitaxy (MBE) or metal-organic chemical vapor deposition (MOCVD). A high-index layer 43.1 consisting of gallium arsenide (GaAs) with a refractive index of n=3.38 and a quarter-wave thickness of 115 nm is then deposited. Typically this is repeated approximately p=25 to 30 times (i.e., 25 to 30 times a low-index/high-index pair). Such a Bragg mirror 41 gives a reflectivity of typically higher than 99.5% and preferably higher than 99.9% at the center of its design wavelength. A reflection of incoming light is schematically depicted by an arrow 54.

Then an absorber layer 44 is deposited inside or at the edge of a transparent half-wave spacer layer 45 on top of the Bragg mirror 41. The transparent half-wave spacer layer 45 does not substantially modify the reflectivity or wavelength range of the Bragg mirror 41. This design is referred to as a "low-finesse" design, since there is no Fabry-Perot mirror element above the spacer layer 45. In one specific embodiment, the absorber layer 44 is indium gallium arsenide ($In_xGa_{1-x}As$), where the ratio x of the indium is 53% and the ratio of the gallium is 1−x=47%. This sets the absorption bandgap of the semiconductor absorber layer 44 to substantially 1550 nm. The thickness of the absorber layer 44 sets the total amount of change in absorption (i.e., the modulation depth $\Delta R$) of the saturable absorber mirror device 4.1. In our described example, the InGaAs absorber layer 44 is approximately 5 nm thick, and the half-wave spacer layer 45 consisting of GaAs has a total thickness of 229 nm including the 5 nm thickness of the absorber layer 44. With an absorber thickness of 5 nm, we obtain a modulation depth of approximately 0.1% to 0.2% (the difference depending on the exact growth and fabrication of the saturable absorber mirror device). Note that the different index of refraction of the absorber layer 44 compared to the spacer layer 45 and its thickness have to be taken into account for designing the completed half-wave layer thickness, although for most designs this slight difference is negligible.

The absorber layer 44 can be positioned at an arbitrary point in the electric field of the optical beam within the Bragg reflector 41, by selecting the position of the absorber layer 44 within the half-wave layer 45. Typically the electric field in the half-wave layer 45 starts at substantially zero at one end, increases to a maximum in the middle, then decreases down to substantially zero at the exit surface. By positioning the absorber layer 44 substantially in the middle of the half-wave layer 45, we achieve maximum saturation of the absorber 44 for a given incident optical intensity, and we also achieve a minimum effective saturation fluence for the saturable absorber mirror 4.1. However it can be desirable to reduce the modulation depth of the device 4.1 by positioning the absorber layer 44 closer to either end of the half-wave spacer layer 45. If the absorber layer 44 is positioned effectively at a very end of the half-wave spacer layer 45, the electric field strength approaches zero, and the modulation depth and effective saturation of the absorber 44 also approach zero. However, these two effects counterbalance any change of the QML threshold.

One important materials issue with InGaAs absorbers is the "strain" introduced by the high concentration of indium. This is due to a change in the lattice constant, i.e. the atomic spacing, in the crystalline structure, as the indium concentration is increased. This strain between the underlying GaAs layer and the InGaAs absorber layer due to the lattice mismatch results in build-up of stress which causes crystalline defects to form to relieve such stress. The effect is termed "relaxation" of the lattice, i.e. the lattice constant then returns to its "natural" value for the InGaAs. In the absorbers disclosed here with approximately 53% In concentration, the critical thickness, i.e. where the material begins to fully relax, is on the order of 2 nm. This means that for representative absorber layer thickness, we expect to have fully-relaxed absorber layers. Normally this results in a substantial decrease in the crystalline and optical qualities of the absorber layer and all crystalline material layers subsequently grown on top of this layer. This can result in strong surface cross-hatching or hazing, corresponding to poor optical quality and reflectivity, which may result in unsatisfactory laser performance, to the level that passive modelocking can even be suppressed or the laser cannot operate above the power level necessary to reach the QML threshold.

We have observed, however, that we can avoid these problems by growing thin layers, in the range of 20 nm or less, in last "spacer" layer of the structure, such that the absorber is about 110 nm or less from the surface. The remaining top layer of approximately 100 nm can be grown with a minimum of crystalline and optical quality degradation. This process is also apparently helped by growing the absorber layer at reduced growth temperature, typically below 440C. (where In adsorbs from the already-grown material) to as low as 250C. (preferred is circa 380C.). Even if there are defects in the absorber layer due to lattice mismatches, the small thickness of the absorber layer plus the thickness of the top layer (in the range of approximately 100 nm to 125 nm for a GaAs top layer, potentially as thick as 200 nm in the case of using an AlAs top layer) usually results in a final device with low non-saturating losses and a good optical quality surface.

It is worth noting that the absorber layer thickness is approaching (theoretically) a value where quantum-well effects can play a role (i.e. where confinement of the absorber layer produces a shift in the bandgap energy). Normally a quantum well would have an enhanced exciton peak, resulting in a lower saturation fluence for the absorber. However for absorber layers with high levels of Indium (53% typically for absorption of 1.55 $\mu$m light), the material is typically highly relaxed (i.e. disordered). This means that although it is a very thin layer, and there may be confinement effects typical of quantum wells, these effects are smeared out so that they are effectively negligible. Fortunately quantum well and exciton effects are not essential for proper saturable absorber mirror operation, and the absorber layer thickness is a parameter chosen to achieve a desired modulation depth $\Delta R$. Note that in any case the temperature of the absorber can be changed to cause a shift in the absorption versus wavelength profile.

It may be desirable to passivate and protect the surface of the semiconductor spacer layer 45, i.e., to prevent contaminants and oxidants from possibly degrading the optical qualities of the semiconductor material. In this case, it is possible to put a very thin layer 46 of a material such as silicon (Si) directly on the top of the last semiconductor layer 45. If this passivation (or protection) layer 46 is very thin, it does not substantially change the optical properties of the saturable absorber mirror device 4.1. However it will sufficiently protect and passivate the top surface. For example, several nanometers (typically 2 to 20 nm, preferably 2 to 4 nm) of silicon can be directly deposited on the top surface of the saturable absorber mirror 4.1 after it has been fabricated in an MBE or MOCVD system. This coating step can be done in the same system before the saturable absorber mirror device 4.1 has been removed from the coating chamber (which is under high vacuum) and before it has been exposed to possible contaminants and oxidants (oxygen and water vapor in room air, for example). The passivation layer 46 lets us operate the saturable absorber mirror device 4.1 at higher optical intensities before damage occurs, which in turn facilitates achieving higher repetition rate modelocking as described by Eq. (1), by improving the fluence ratio on the saturable absorber mirror device 4.1.

Another observation that we have made is that small reflections from the rear surface of the saturable absorber mirror can cause etalon effects which can cause very small but undesired modulation to the reflectivity response of the saturable absorber mirror. This etalon effect from the saturable absorber mirror can be reduced or removed by processing the saturable absorber mirror to have a wedged rear surface. Due to the high index of refraction of the GaAs substrate material, a wedge of substantially greater than 1 degree, preferable 3–5 degrees, can be used.

Figure 9:
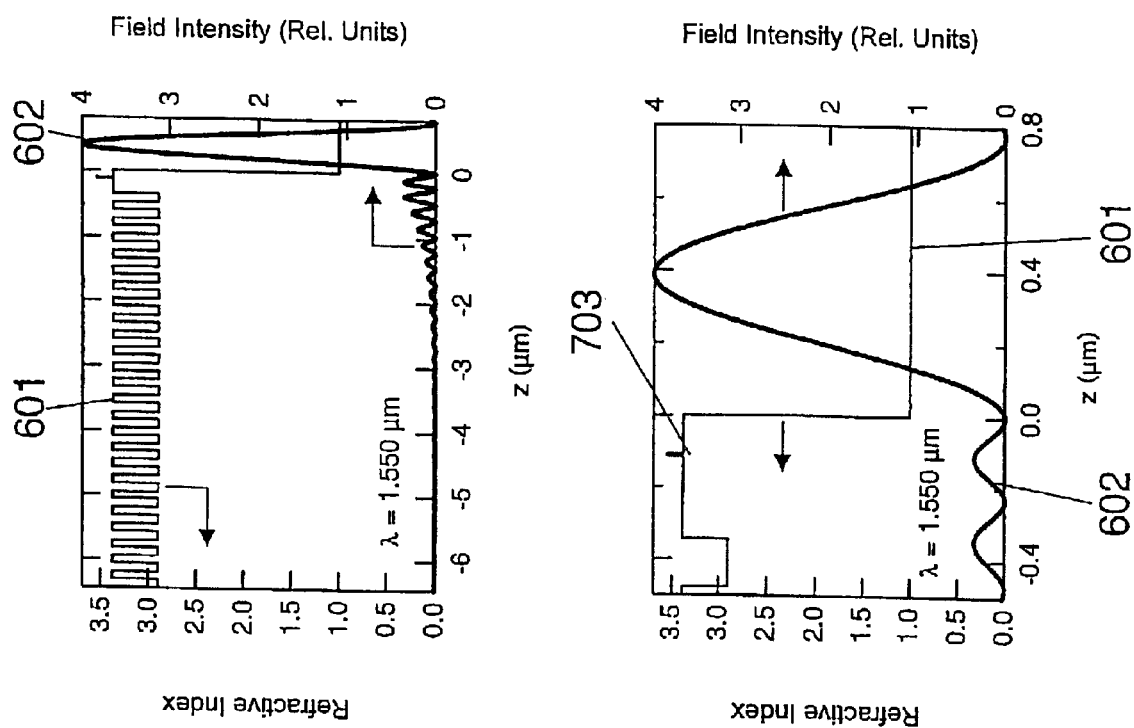
FIG. 9 shows the calculated electric field intensity and the refractive index as a function of the distance from the surface of one preferred saturable absorber mirror embodiment. Left hand side axis is the refractive index and right hand side the field intensity normalized to 4.

FIG. 9 shows the refractive index 601 and the calculated electrical field intensity 602 in a saturable absorber mirror device as a function of the distance from the saturable absorber mirror surface. The setup is chosen so that electrical field intensity inside the transparent half wave spacer layer is at a local maximum at the position 703 of the absorber layer 44, as can be seen in the lower panel of the Figure.

Figure 10:
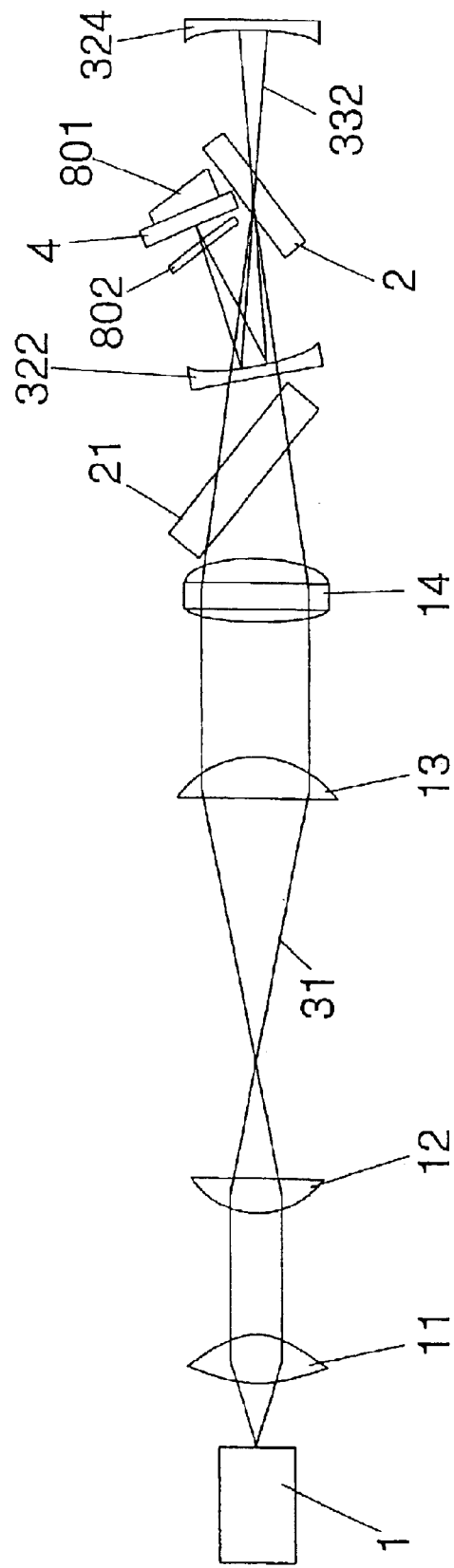
FIG. 10 depicts an embodiment of the laser according to the invention wavelength and cavity length tuning means.

It is also possible to introduce wavelength selective elements such as a prism, rotatable grating, filters, etalons, interferometers etc. into the laser cavity to control the center wavelength of the laser emission. Further, also tuning means for repetition rate tuning may be present. FIG. 10 shows, as an example, the laser of FIG. 4 together with such means. The repetition rate tuning means 801, i.e. the cavity length stabilizing and tuning means is e.g. a piezo element, on which a mirror element—in the shown embodiment the saturable absorber 4—is mounted. Instead of a piezo element, the repetition rate tuning means could also be a movable glass wedge or a prism arranged transversely in the cavity or anything else which influences the optical roundtrip path in the cavity. The wavelength tuning element 802 is preferably an etalon with solid or free space or a birefringent filter or a combination of these two elements. It could also be an intracavity dispersive element such as a prism or the like.

According to an embodiment of the invention, a micro-optics arrangement is chosen, which allows the combination of this laser with means to tune and lock the laser wavelength, at the same time to tune and lock the cavity length of the laser to synchronize the pulse repetition rate to a master reference clock.

Repetition rate locking is achieved by providing a means to move one of the cavity elements. A preferred embodiment is to put the saturable absorber mirror (which is small and has low mass, thereby allowing for maximum operating frequency of the moving element) onto a piezoelectric element which can move the saturable absorber mirror in the direction of the optical axis by approximately one micron. This allows us to adjust the cavity repetition rate by approximately 0.67 MHz per micron of cavity length change at 10 GHz repetition rate, or by 10.7 MHz per micron at 40 GHz repetition rate.

Figure 14:
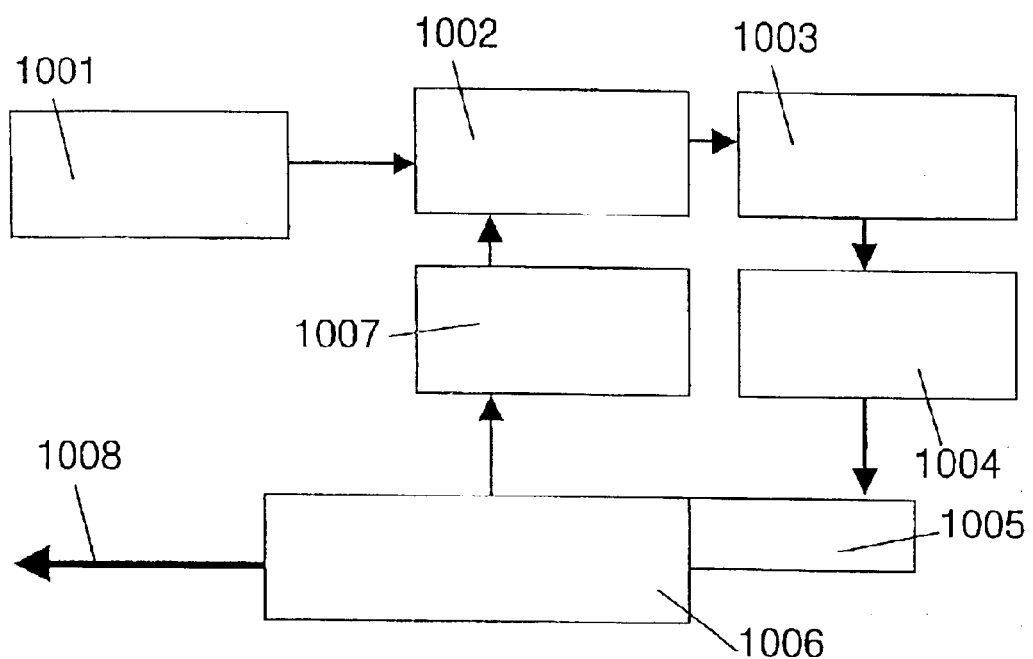
FIG. 14 shows a block diagram of a system according to the invention comprising a phase lock loop circuit and a laser according to any embodiment of the invention.

FIG. 14 shows a block diagram of an active synchronization design which makes use of this potential. An external clock, used as a clock reference 1001 is injected into the phase locked loop (PLL) comprising a phase comparator 1002, a loop filter 1003, an actuator driver 1004, an actuator 1005, for example a piezoelectric element upon which a laser cavity component—such as the saturable absorber device—is mounted, and the laser 1006 (here being a passively mode locked erbium glass pulse generating laser) itself and a fast photodiode 1007 converts the laser's optical pulses into an electronic signal. The two signals are mixed in the phase comparator and an error signal is created. The loop filter defines the frequency bandwidth of the PLL and is chosen based on the characteristics of the source and the requirements of the application. The set-up results in a train of synchronized pulses 1008.

An actuator is used to physically lock the laser pulses by controlling the length of the laser cavity. Repetition frequency is inversely proportional to cavity length and the actuator synchronizes the laser pulses to the external clock based on the error signal. The laser is the voltage-controlled oscillator in the PLL diagram and the timing jitter of the laser's output pulses is determined by the electronic circuit design, the clock's jitter, and the inherent phase noise in the laser itself.

Jitter in digital communications is the offset between the expected position of a transition to a one or zero and the actual position. This displacement in time has both spectral and power content. The noise that causes jitter is not uniform over all frequencies. Jitter is expressed in the time domain and phase noise is the frequency domain representation, where there is a mathematical relationship between the integrated phase noise and the root mean square (rms) jitter. Frequency limits are used to define the range of spectral power measurements used in the phase noise calculation.

Figure 15:
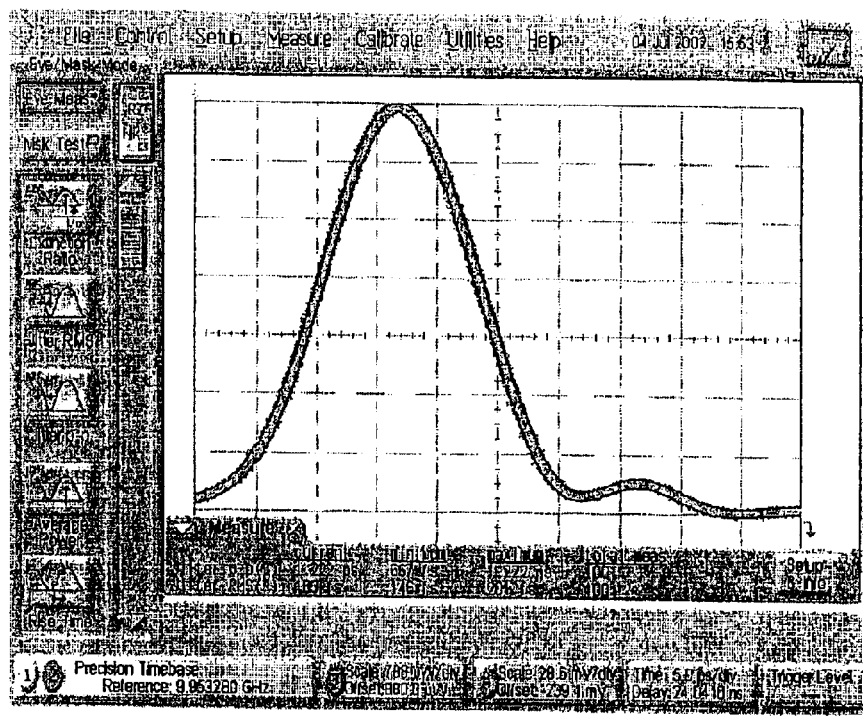
FIGS. 15 and 16 depict measurements of the ouput pulse and the RMS jitter, and of the phase noise, respectively, of a system as shown in FIG. 14.
Figure 16:
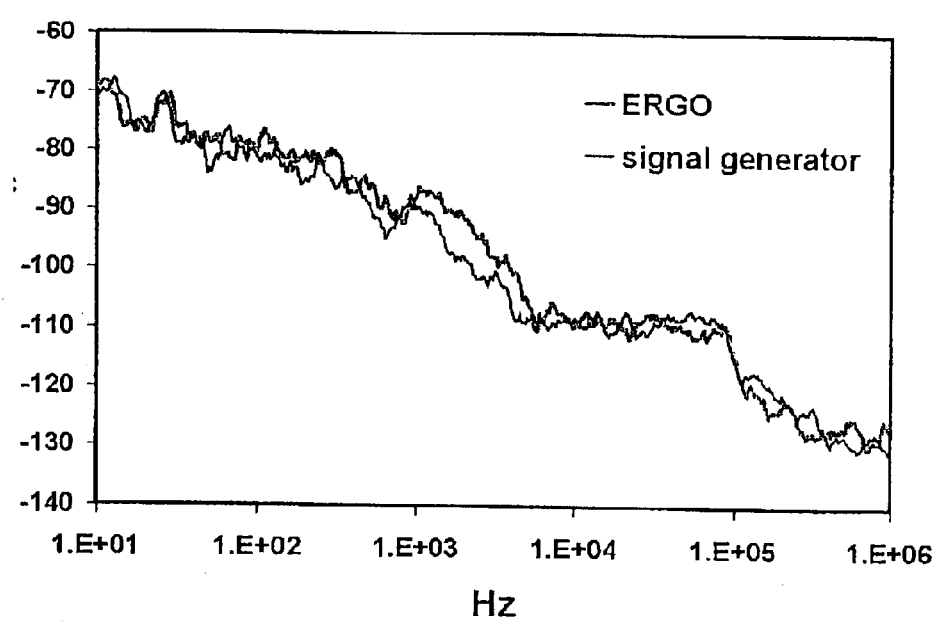

This data in FIGS. 15 and 16 shows the timing fluctuations of the PGL output pulses versus one period of the reference clock, which in the case shown in the figure was an Agilent Microwave Signal Generator. The measurement results in a timing jitter of 183 fs. The Signal Generator has a jitter specification of 200 fs rms so the measurement results indicates that the PGL jitter is quite a bit lower than that and the clock jitter is also better than the specification. A phase noise measurement can provide a better picture of the PGL's actual rms jitter.

FIG. 16 shows a comparison of the measured phase noise between the PGL ("ERGO", grey curve) and the signal generator used as the reference clock ("signal generator", black curve). An Agilent E8241A with the low noise option was used as the clock. Spectral measurements were made using an Agilent 8565EC 50 GHz Microwave Spectrum Analyzer with a phase noise module. The measurement range was from 10 Hz up to 1 MHz and the results show clearly that the PGL adds very little phase noise to the clock signal. The figure is indicative of a sub-100 fs rms jitter from the laser pulses.

Figure 11:
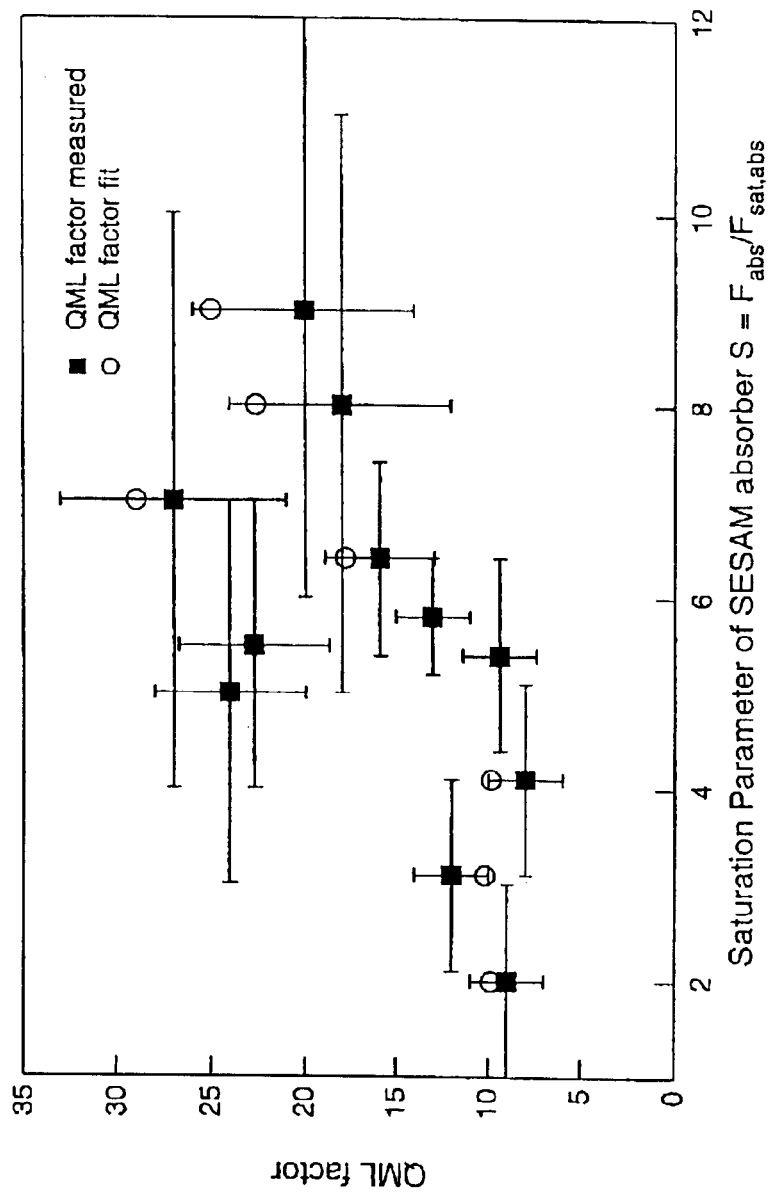
FIG. 11 shows a plot of the measured QML factor as a function of the saturation parameter of the saturable absorber mirror for a number of different cavity configurations.

As mentioned previously, we have observed that the surprising fact that the pulse energy for QML threshold is significantly lower than standard expected QML threshold. We have investigated this effect. FIG. 11 shows a plot of the measured QML factor as a function of the saturation parameter of the saturable absorber mirror for a number of different cavity configurations (each data point corresponds to a separate laser). The data points come from a set of experiments where we mapped out the parameter space changing the saturation parameter of the saturable absorber mirror, the saturation parameter of the gain, and the repetition rate of an Er:Yb:glass laser with a single saturable absorber mirror.

From this data we have calculated an empirical fit which correlates the observed QML factor q to the mode size in the laser material. The figure shows first of all that we measure QML parameters between 5 and 30. The calculated data, referred to as QML factor fit, originates from the following procedure. In the data points with a saturation parameter of the saturable absorber mirror around 5.5 (that do not show any obvious fit or correlation) we see a clear trend of the QML factor versus gain saturation factor ($S_{gain}=F_{gain}/F_{sat,gain}$), which can then be fitted. Taking this analytical dependence of the QML factor on the gain saturation as given, we can then calculate the QML factor for the other lasers with different saturation parameters of the saturable absorber mirror and different repetition rates and we get a good agreement with the measured data.

This empirically observed improvement in the QML threshold of these lasers is one important factor allowing us to achieve high repetition rates as disclosed here.

Figure 12:
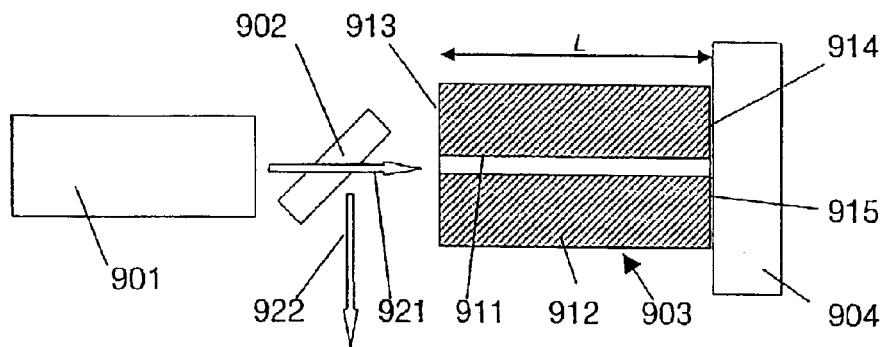
FIG. 12 depicts a preferred embodiment of a quasi-monolithic passively mode-locked guided miniature laser.

FIG. 12 shows a preferred embodiment of a quasi-monolithic passively mode-locked guided miniature laser with ultra-high repetition rates. A single-mode 976 nm pump diode is used to end-pump the guided gain element. In the figure, the pump diode and transfer optics are combined in integrated optical pumping means 901. Single mode radiation ensures high coupling efficiency into the gain element, and is achieved by appropriate corresponding transfer optics. A dichroic beam splitter 2 is inserted into the pump beam in order to decouple the output pulse train 922 from the pump beam 921. The dichroic beam splitter, in the embodiment described here, is highly transmissive (antireflective) at wavelengths around 976 nm and highly reflecting at wavelengths around 1535 nm.

Further, a guided gain structure 903 is provided. The guided gain structure 903 comprises Er:Yb: doped material 911, for example Er:Y: doped phosphate glass. According to one embodiment, recently developed materials may be used, such as Kigre's "MM-2 1.55 um laser Oscillator/Amplifier phosphate glass in ion-exchanged lossless waveguides or fibers" or materials as disclosed in the publications R. Lange et al., "High gain short length phosphate glass erbium doped fiber amplifier material," OSA Optical Fiber Communications (OFC) 2001 and A. Shooshtari et al., Photonics West, LASE '98, SPIE Proceedings Vol. 3280, 1998. These two publications are incorporated herein by reference. The guided gain structure comprises a core and surrounding material 912 which usually is termed 'cladding'. The surrounding material has a index of refraction which differs from the index of refraction of the core material. From the above named publication and from general experience, the expert will know a large variety of core material/cladding material combinations.

One end face 913 of the guided gain structure is anti-reflection coated (Coating 1 in the Figure) for the pump radiation (976 nm in the embodment descibed here), and coated for the desired transmission at the laser wavelength (here: 1535 nm), typically 0.2–1%. The other end 914 of the guided gain structure is anti-reflection coated for the laser wavelength and high-reflection coated for the pump wavelength, in order to allow for a double pass of the pump radiation and thus increase the pump absorption.

The laser further comprises a saturable absorber mirror device 904. The saturable absorber mirror device may for example be one of the newly developed saturable absorber devices mentioned above. The saturable absorber mirror device may as an alternative also be any conventional or newly developed saturable absorber device comprising a mirror element or a mirror functionality.

The saturable absorber may, according to a first embodiment, be directly attached to the gain element. It could be, for example, diffusion bonded to the gain element to avoid any residual reflection of the end face of the gain element, which could harm the mode locking behavior. In the case of the direct bonding of the absorber device to the gain element, the second coating is omitted. For details of the process of diffusion bonding, the reader is referred to the U.S. Pat. Nos. 5,441,803 and 5,846,638.

Alternatives are a slight wedge of the end face of the gain element (and a resulting wedge shaped air gap between the gain element and the saturable absorber device) to avoid residual reflections.

As an alternative, a non-wedged (air) gap 915 could be present. Then, the residual reflection could for example be exploited to form a Gires-Tournois interferometer (GTI) together with the saturable absorber mirror device. This can yield negative group delay dispersion which can be used for soliton mode locking. Soliton mode locking is a potentially very useful feature of these lasers, as it allows an extra degree of design freedom to achieve short optical pulses. This is due to the high self phase modulation which can be achieved in the confined mode, and resulting strong soliton formation.

Additionally, for example if the dispersion is far away from the soliton mode locking regime, the gap between the gain element and the saturable absorber can be used to form an etalon with a resulting wavelength filter, which can be used to control the center wavelength of the laser and/or the bandwidth/pulse width of the laser, thereby enabling a laser potentially tunable in both pulse width and in center wavelength.

Passively mode-locked lasers may require a linear polarization of the laser beam. This can be achieved by simply using an asymmetric core of the fiber or the waveguide. Alternatives would be to insert a low-loss polarizing element into the gap between saturable absorber and gain element (such as Polarcor optical material from Corning).

The total length L of the cavity has to be adjusted to the desired pulse repetition rate. For example, at 40 GHz, the free-space cavity length is nominally 3.75 mm, and the repetition rate changes by 10.67 MHz per micron. This requires only a very small adjustment to the cavity length to lock the laser to a reference signal at 40 GHz.

Conversely, it also requires good mechanical cavity stability, otherwise mechanically-induced changes or vibrations to the cavity length would result in large timing jitter or frequency modulation. The design ideas disclosed here allow for a more machanically robust and result in less mechanically-induced timing and frequency jitter.

Figure 13:
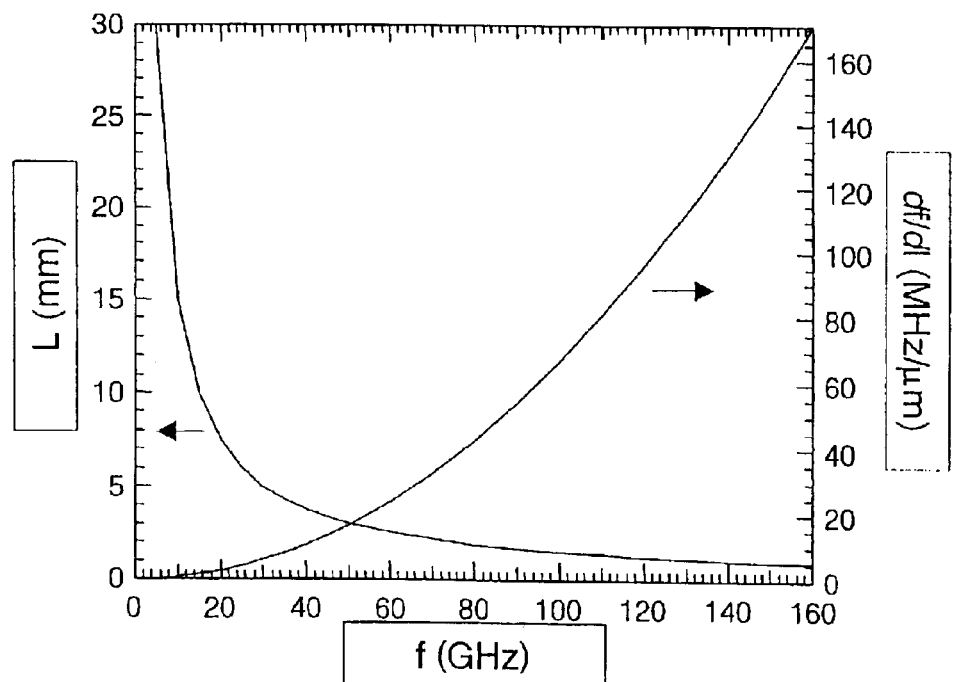
FIG. 13 shows the dependency of the free space cavity length and of the sensitivity of the repetition rate to changes in the cavity as a function of the chosen repetition frequency.

FIG. 13 shows the dependency of the free space cavity length L (left axis) and of the sensitivity of the repetition rate to changes in the cavity length dfreq/dL (right axis) as a function of the chosen repetition frequency f. Of course, for obtaining the physical cavity length, the free space cavity length has to be divided by the effective group velocity index of refraction of the waveguide. Some values of the (free-space) cavity length and of the sensitivity of the repetition rate to changes in the cavity length (i.e. the change in frequency vs. change in cavity length) are also shown in the following table:

| f | L | MHz per um |
|---|---|---|
| 5 | 30.00 | 0.17 |
| 10 | 15.00 | 0.67 |
| 15 | 10.00 | 1.50 |
| 20 | 7.50 | 2.67 |
| 25 | 6.00 | 4.17 |
| 30 | 5.00 | 6.00 |
| 35 | 4.29 | 8.17 |
| 40 | 3.75 | 10.67 |
| 45 | 3.33 | 13.50 |
| 50 | 3.00 | 16.67 |
| 60 | 2.50 | 24.00 |
| 70 | 2.14 | 32.67 |
| 80 | 1.87 | 42.67 |
| 90 | 1.67 | 54.00 |
| 100 | 1.50 | 66.67 |
| 110 | 1.36 | 80.67 |
| 120 | 1.25 | 96.00 |
| 130 | 1.15 | 112.67 |
| 140 | 1.07 | 130.67 |
| 150 | 1.00 | 150.00 |
| 160 | 0.94 | 170.67 |

This larger sensitivity may also allow novel techniques to control and phase lock the laser. For example, miniature micro-electro-mechanical systems (MEMS) structures may be used to control the cavity length to very high accuracy with a very high speed. According to a second embodiment, the saturable absorber device could be mounted on the MEMS structure to allow for maximum adjustment speed (since the mass of the saturable absorber device is typically very small). For the construction of MEMS in general, the reader is referred to the voluminous literature for this particular field. As an example, the reader may find a reference in R. Apte et al., "Grating light valves for high resolution displays", Solid State Sensors and Actuators Workshop, June 1994.

Other techniques to control the cavity length include controlling the temperature of the entire cavity (since the laser cavity is relatively small, it will have a relatively fast thermal response). The laser may thus comprise temperature control means with heating means for actively controlling the temperature. Further techniques include changing the pump power level by a small amount to locally control the temperature at the pump point in the crystal.

Still further techniques to control the cavity length include mounting one element, for example the saturable absorber device, on a piezo element.

The above described embodiments are merely examples of ways to carry out the invention and are by no means limiting. Combinations of the features of these embodiments as well as numerous other embodiments may be envisaged without departing from the spirit and scope of the invention. Further, the invention is not limited by the above outlined physical interpretations of the observed phenomena, should they turn out to be not entirely apt.

What is claimed is:

1. A laser for emitting a train of electromagnetic-radiation pulses characterized by an effective wavelength, the fundamental repetition rate $f_{rep}$ of the emitted pulses exceeding 1 GHz, said laser comprising:

an optical resonator having a total optical roundtrip cavity length 2L, where $f_{rep}=c/2L>1$ GHz, where c is the speed of light;

an Er:Yb:doped solid-state gain element placed inside said optical resonator;

optical pumping means for exciting said laser gain element, by optical pumping, to emit electromagnetic radiation characterized by the effective wavelength; and means for passive modelocking comprising a saturable absorber, said means for passive modelocking being operable to mode-lock the electromagnetic radiation emitted by the laser gain element, resulting in said train of electromagnetic radiation pulses.

2. The laser of claim 1 wherein said gain element is an Er:Yb:glass gain element.

3. The laser of claim 1 wherein said means for passive modelocking are a reflecting semiconductor saturable absorber device.

4. The laser of claim 3 wherein said saturable absorber has a modulation depth below 0.5% and non-saturating loss of below 0.5%.

5. The laser of claim 3 wherein said reflecting semiconductor saturable absorber device comprises a stack of alternating GaAs/AlAs layers, at least one GaAs spacer and an InGaAs absorber layer.

6. The laser of claim 5, wherein said reflecting saturable absorber comprises at least one stack of alternating GaAs/AlAs layers and wherein said saturable absorber comprises an absorber layer of less than or equal to 10 nm thickness of relaxed $In_xGa_{1-x}As$, where x is substantially greater than or equal to 0.48.

7. The laser of claim 6, wherein the absorber layer has a thickness less than or equal to 7 nm, wherein the absorber layer is arranged at or near the surface of the saturable absorber mirror structure.

8. A laser according to claim 3, wherein the reflecting semiconductor saturable absorber device has a modulation depth of less than 0.5%.

9. A laser according to claim 3 wherein said reflecting semiconductor absorber device comprises a passivation layer being a thin outermost layer of a thickness below 20 nm.

10. A laser according to claim 9, wherein said passivation layer is a Si layer.

11. A laser according to claim 3, wherein the cavity comprises focusing elements focusing the electromagnetic radiation such that the mode radius in the gain element is below 80 μm and the mode radius on the semiconductor saturable absorber is below 50 μm.

12. A laser according to claim 11, wherein the focusing elements focus the electromagnetic radiation such that the mode radius in the gain element is below 30 μm and the mode radius on the reflecting semiconductor saturable absorber device is below 20 μm.

13. A laser according claim 1 comprising pumping beam focusing means for focusing an optical pumping beam emitted by said optical pumping means to a focal point inside the optical resonator, said gain element being placed at or near the focal point of the optical pumping beam.

14. A laser according to claim 1 comprising pumping beam focusing means for focusing an optical pumping beam emitted by said optical pumping means, wherein the optical resonator comprises curved mirror elements being arranged in a manner that electromagnetic radiation circulating in the resonator is focused twice, wherein said curved mirror elements and said pumping beam focusing means are chosen and arranged in a manner that a first focal point of the circulating beam essentially coincides with a focal point of the optical pumping beam, wherein the gain element is placed at or near said first focal point, and wherein the saturable absorber is placed at or near a second focal point of the circulating beam.

15. A laser according to claim 1, wherein the total optical roundtrip cavity length 2L of the optical resonator fulfills $f_{rep}=c/2L>2$ GHz, where c is the speed of light.

16. The laser according to claim 15, wherein total optical roundtrip cavity length 2L of the optical resonator fulfills $f_{rep}=c/2L>10$ GHz, where c is the speed of light.

17. The laser of claim 16, wherein the total optical roundtrip cavity length 2L of the optical resonator fulfills $f_{rep}=c/2L>40$ GHz, where c is the speed of light.

18. A laser according to claim 1 comprising wavelength tuning means for tuning the effective wavelength.

19. A laser according to claim 1 comprising means for tuning the fundamental repetition rate.

20. A laser according to claim 1 further comprising wavelength locking means for locking the effective wavelength.

21. A laser according to claim 1 wherein said means for exciting said laser gain element comprise a single spatial mode laser diode.

22. A laser according to claim 1 wherein said means for exciting said laser gain element comprise a high brightness single-emitter broad-area laser diode.

23. A laser according to claim 1 being designed for operation at an effective wavelength in a wavelength range between 1525 nm and 1620 nm.

24. A laser according to claim 1, wherein said Er:Yb-:doped solid-state gain element is formed as to guide electromagnetic radiation characterized by said effective wavelength and at least partially forms said optical resonator.

25. A laser according to claim 24, wherein said gain element is an Er:Yb: doped glass fiber or a waveguide comprising Er and Yb dopants.

26. A laser according to claim 1 comprising means for soliton mode locking.

27. A laser according to claim 1 comprising an absorbing reflector structure with a back-side wedged and/or a roughened back side to avoid spurious reflections from the back surface.

28. A laser according claim 1 comprising at least one wavelength tuning element.

29. A laser according claim 28 comprising a solid etalon having a thickness of below 100 μm, such that it has a free spectral range of 1 THz or more.

30. A laser according to claim 28 comprising an air-spaced etalon having a thickness below 100 μm.

31. A laser according to claim 1, further comprising means for adjusting a total laser cavity length.

32. A laser according to claim 31, wherein said means for adjusting a total laser cavity length comprise an actuator, on which an optical component of the cavity is mounted, and wherein preferably said optical component is a saturable absorber device.

33. A laser system comprising a laser according to claim 31 and further comprising a system clock and a phase lock loop system comprising said means for adjusting the total laser cavity length, these components being configured in a manner that the laser is synchronized with the system clock.

34. A laser for emitting a train of electromagnetic-radiation pulses characterized by an effective wavelength, the fundamental repetition rate $f_{rep}$ of the emitted pulses exceeding 1 GHz, said laser comprising:
an optical resonator having a total optical roundtrip cavity length 2L, where: $f_{rep}=c/2L>1$ GHz and where c is the speed of light;
a solid state gain element placed inside said optical resonator;
means for exciting said laser gain element to emit electromagnetic radiation characterized by the effective wavelength, said means comprising a single mode diode pump laser with an output power of at least 0.1W; and
means for passive modelocking comprising a saturable absorber, and means for passive modelocking being operable to mode-lock the electromagnetic radiation emitted by the laser pain element, resulting in said train of electromagnetic radiation pulses.

35. A laser for emitting a train of electromagnetic-radiation pulses characterized by an effective wavelength, the fundamental repetition rate of the emitted pulses exceeding 1 GHz, said laser comprising:
an optical resonator,
a solid state gain element placed inside said optical resonator;
means for exciting said laser gain element to emit electromagnetic radiation characterized by the effective wavelength, and
means for passive modelocking comprising saturable absorber mirror with GaAs/AlAs mirrors and a less than or equal to 10 nm thick absorber layer comprising $In_xGa_{1-x}As$ with $0.48<x<0.58$.

36. The laser of claim 35, wherein the absorber layer has a thickness of less than or equal to 7 nm, wherein the absorber layer is arranged at or near the surface.

37. A laser for emitting a train of electromagnetic-radiation pulses characterized by an effective wavelength, the fundamental repetition rate $f_{rep}$ of the emitted pulses exceeding 1 GHz, said laser comprising:

an optical resonator having a total optical roundtrip cavity length 2L, where: $f_{rep}=c/2L>1$ GHz and where c is the weed of light;

an Er:Yb:doped solid-state gain element placed inside said optical resonator;

pumping means for exciting said laser gain element to emit electromagnetic radiation characterized by the effective wavelength; and means for passive modelocking comprising a saturable absorber, said means for passive modelocking being operable to mode-lock the electromagnetic radiation emitted by the laser pain element, resulting in said train of electromagnetic radiation pulses, wherein the optical resonator comprises focusing elements focusing the electromagnetic radiation such that the mode radius in the gain element is below 80 µm and the mode radius on the semiconductor saturable absorber is below 50 µm.

38. The laser of claim 37, wherein the total optical roundtrip cavity length 2L of the optical resonator fulfills $f_{rep}=c/2L>10$ GHz, where c is the speed of light.

39. A laser for emitting a train of electromagnetic-radiation pulses characterized by an effective wavelength, the fundamental repetition rate of the emitted pulses exceeding 1 GHz, said laser comprising:

an Er:Yb:doped solid-state gain element being formed as to guide electromagnetic radiation characterized by said effective wavelength and at least partially forming an optical resonator for said electromagnetic radiation pulses, said optical resonator having a total optical roundtrip cavity length 2L, where: $f_{rep}=c/2L>1$ GHz and where c is the speed of light;

optical pumping means for exciting said laser gain element to emit electromagnetic radiation characterized by the effective wavelength; and means for passive modelocking comprising a saturable absorber, said means for passive modelocking being operable to mode-lock the electromagnetic radiation emitted by the laser gain element, resulting in said train of electromagnetic radiation pulses.

40. A laser according to claim 39, wherein said gain element is an Er:Yb: doped glass fiber or a waveguide comprising Er and Yb dopants.

41. A laser according to claim 39 comprising means for soliton mode locking.

42. A method for emitting a train of electromagnetic-radiation pulses characterized by an effective wavelength, comprising the steps of:

exciting an Er:Yb:doped solid-state laser gain element to emit electromagnetic radiation characterized by the effective wavelength, said laser gain element being placed inside an optical resonator having a total optical roundtrip cavity length 2L, where $f_{rep}=c/2L>1$GHz and where c is the speed of light;

recirculating said electromagnetic radiation in said optical resonator; and passively modelocking said electromagnetic radiation using a saturable absorber so that said train of electromagnetic radiation guises is generated.

43. The method of claim 42 wherein said saturable absorber is chosen to be a saturable absorber mirror device essentially made of semiconductor material.

44. The method of claim 42, wherein the total optical roundtrip cavity length 2L of the optical resonator fulfills $f_{rep}=c/2L>10$ GHz, where c is the speed of light.

45. The method of claim 44, wherein the total optical roundtrip cavity length 2L of the optical resonator fulfills $f_{rep}=c/2L>40$ GHz, where c is the speed of light.

46. A method for emitting a train of electromagnetic-radiation pulses characterized by an effective wavelength, comprising the steps of:

focusing an optical pumping beam on a solid state laser gain element for exciting it to emit electromagnetic radiation characterized by the effective wavelength, said laser gain element being placed inside an optical resonator, the total optical roundtrip cavity length 2L of which fulfills $f_{rep}=c/2L>1$ GHz;

recirculating said electromagnetic radiation in said optical resonator, passively modelocking said electromagnetic radiation using a saturable absorber so that said train of radiation pulses results, and focusing said electromagnetic radiation such that the spatial mode radius in the gain element is below 80 µm and on the semiconductor saturable absorber below 50 µm.

* * * * *

UNITED STATES PATENT AND TRADEMARK OFFICE
CERTIFICATE OF CORRECTION

PATENT NO. : 6,778,565 B2
DATED : August 17, 2004
INVENTOR(S) : Spuehler et al.

It is certified that error appears in the above-identified patent and that said Letters Patent is hereby corrected as shown below:

Column 26,
Line 46, delete "and" and insert -- said --.
Line 48, delete "pain" and insert -- gain --.

Column 27,
Line 17, delete "pain" and insert -- gain --.

Column 28,
Line 18, delete "guises" and insert -- pulses --.

Signed and Sealed this

Seventh Day of December, 2004

JON W. DUDAS
*Director of the United States Patent and Trademark Office*